US007277095B2

(12) United States Patent
Beaumont

(10) Patent No.: US 7,277,095 B2
(45) Date of Patent: Oct. 2, 2007

(54) METHOD OF RENDERING GRAPHICAL OBJECTS

(75) Inventor: Ian Richard Beaumont, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 11/071,152

(22) Filed: Mar. 4, 2005

(65) Prior Publication Data
US 2005/0206653 A1 Sep. 22, 2005

(30) Foreign Application Priority Data
Mar. 16, 2004 (AU) .............................. 2004901386

(51) Int. Cl.
*G06T 11/00* (2006.01)
(52) U.S. Cl. ..................................... 345/421
(58) Field of Classification Search ................ 345/421, 345/424
See application file for complete search history.

(56) References Cited

U.S. PATENT DOCUMENTS

| 5,859,959 | A | 1/1999 | Kimball et al. ........ 395/182.02 |
| 5,926,185 | A | 7/1999 | Vyncke et al. ............... 345/433 |
| 6,115,049 | A * | 9/2000 | Winner et al. ............... 345/432 |
| 6,278,457 | B1 * | 8/2001 | Bernardini et al. ........ 345/420 |
| 6,392,644 | B1 * | 5/2002 | Miyata et al. ............... 345/419 |
| 6,515,763 | B1 | 2/2003 | Dermer et al. ............... 358/1.9 |
| 6,577,777 | B1 | 6/2003 | Yoshino et al. ............. 382/284 |
| 6,781,600 | B2 * | 8/2004 | Anwar ........................ 345/620 |
| 2004/0012617 | A1 | 1/2004 | Beaumont et al. .......... 345/690 |

FOREIGN PATENT DOCUMENTS

EP 0 753 832 * 1/1997

OTHER PUBLICATIONS

Meagher, "Efficient Synthetic Image Generation of Arbitrary 3-D Objects", 1982, IEEE, pp. 473-478.*

* cited by examiner

Primary Examiner—Almis R. Jankus
(74) Attorney, Agent, or Firm—Fitzpatrick, Cella, Harper & Scinto

(57) ABSTRACT

A method of rendering a plurality of graphical objects, each having a predetermined object outline, a predetermined z-order, and an associated fill, the object outline for a particular object defining an area in which the particular object is filled, includes the steps of (a) combining each of the objects to form a grouped object, the grouped object having a grouped object outline and an associated compound fill, the compound fill comprising a plurality of fill data structures describing the fills associated with the graphical objects, and (b) rendering the grouped object according to the grouped object outline, wherein one or more fills used to render the grouped object are determined according to the compound fill. The rendering includes the steps of, at a current pixel, (b)(i) calculating a position of the current pixel relative to a tracking point defined for the compound fill, (b)(ii) determining a current one of the fills using the calculated relative position, and (b)(iii) generating a color for the pixel using the determined current fill.

21 Claims, 18 Drawing Sheets

210

220

230

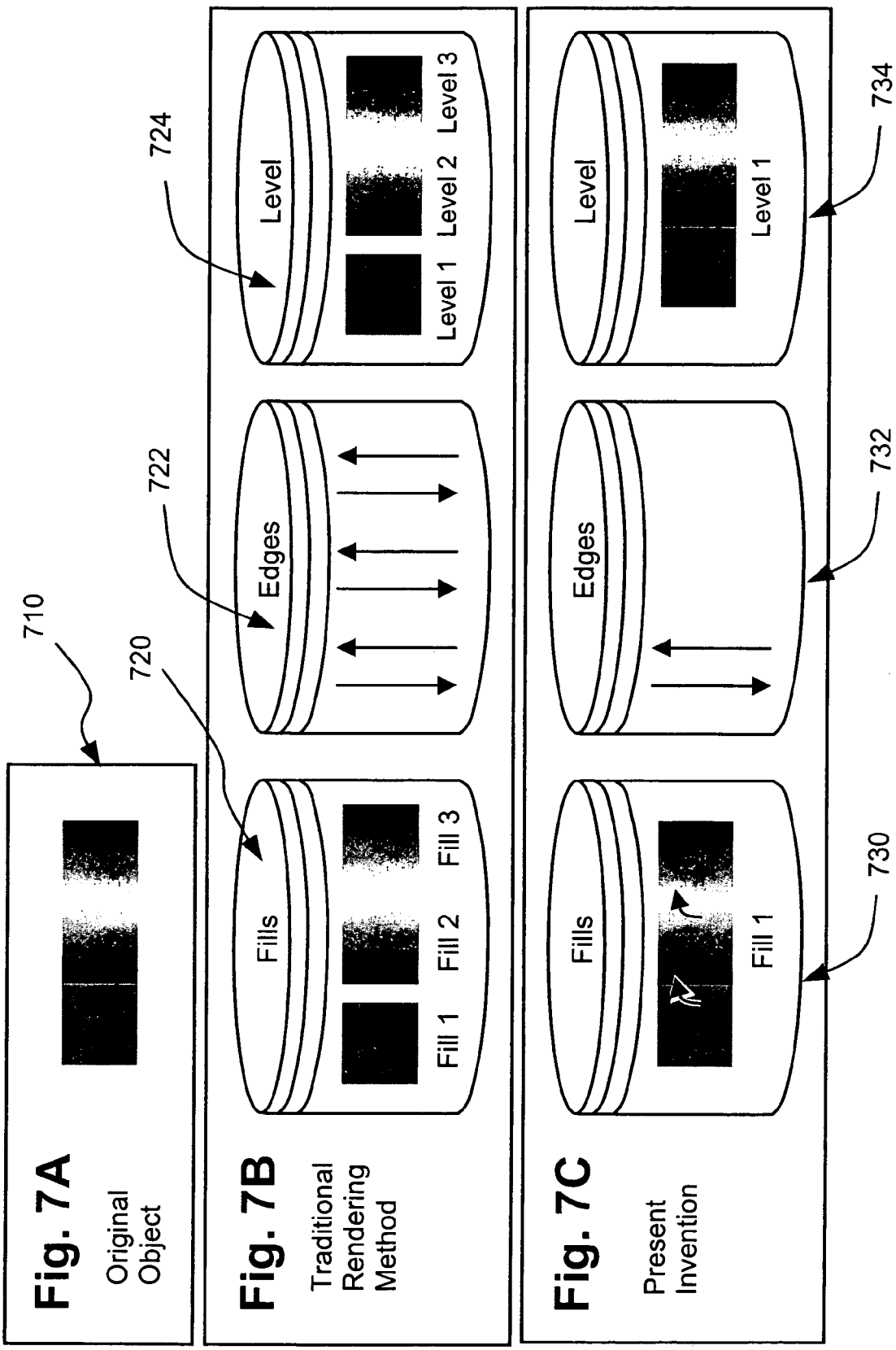

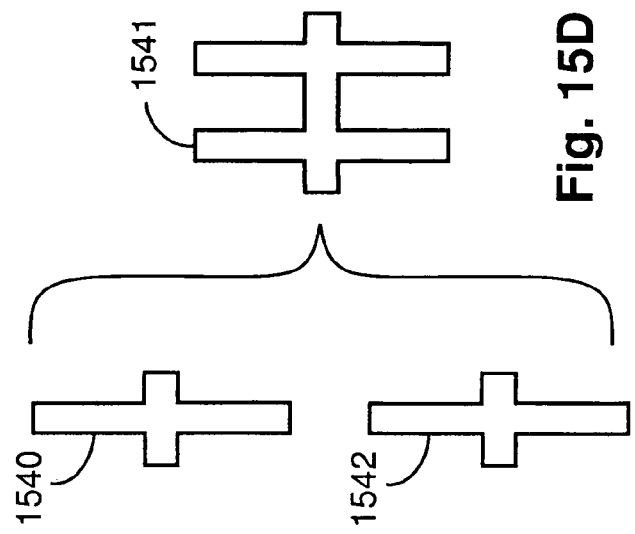
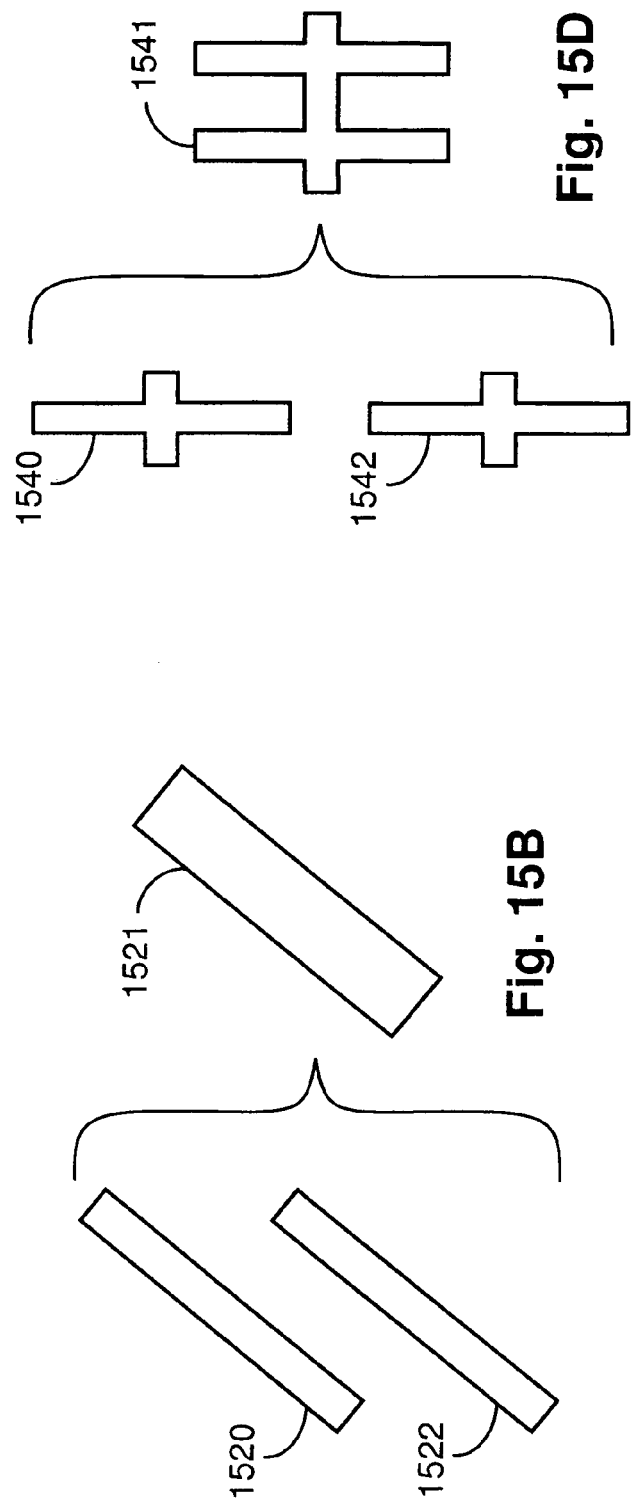

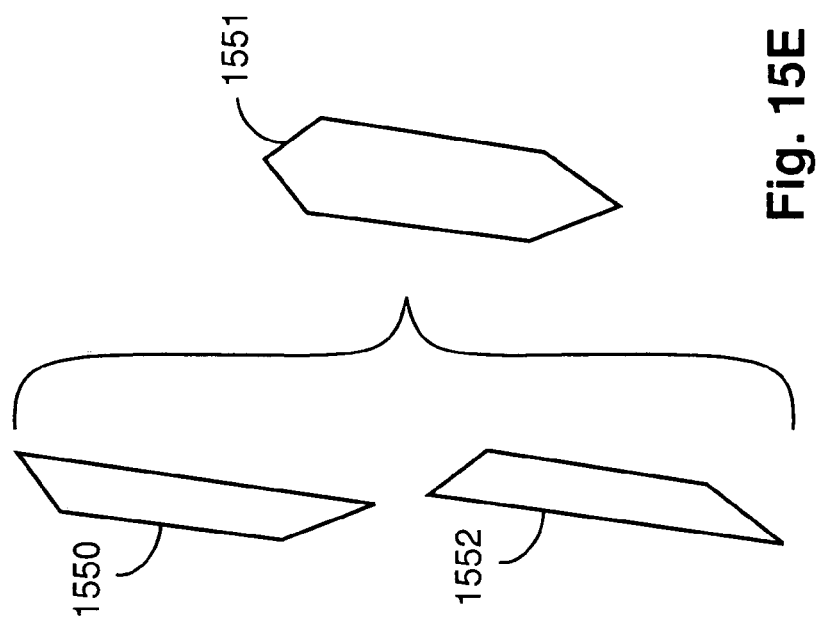
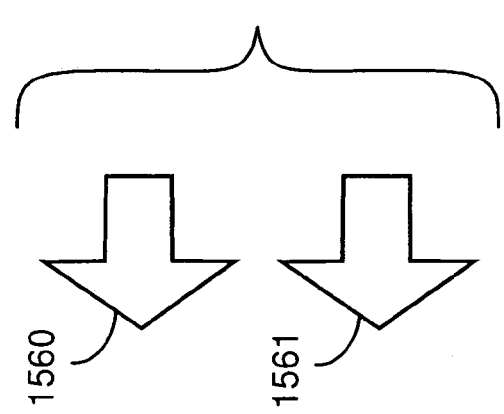
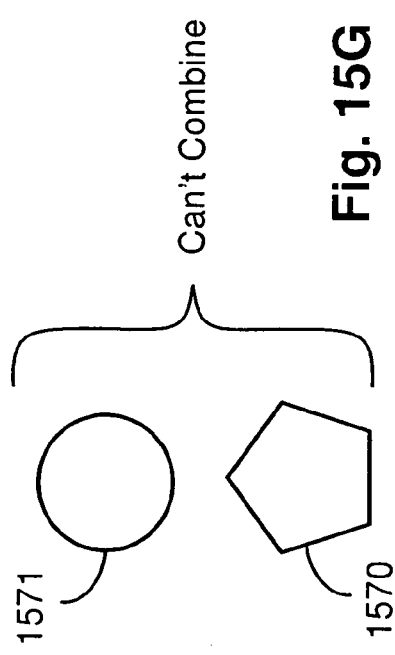

METHOD OF RENDERING GRAPHICAL OBJECTS

CROSS-REFERENCE TO RELATED PATENT APPLICATIONS

This application claims the right of priority under 35 U.S.C. § 119 based on Australian Patent Application No. 2004901386, filed 16 Mar. 2004, which is incorporated by reference herein in its entirety as if fully set forth herein.

FIELD OF THE INVENTION

The present invention relates generally to image processing and, in particular, to a method of rendering a plurality of graphical objects. The present invention also relates to a method and apparatus for rendering a plurality of graphical objects, and to a computer program product including a computer readable medium having recorded thereon a computer program for rendering a plurality of graphical objects.

BACKGROUND

Conventional software applications, such as word processors, create page-based documents where each page may contain one or more graphical objects (ie., text, lines, fill regions and/or image data). When representing such documents on a display device or a printing device, a software application typically sends commands to the device. These commands are typically defined by graphical interface services associated with a native operating system which is executing the software application. One such operating system is Windows™. The graphics interface services of the Windows™ operating system are typically referred to as a graphics device interface (GDI) layer. The GDI layer may be implemented as an application programming interface (API) being executed by the operating system and providing a rich set of graphics features to software applications being executed by the operating system.

A graphics rendering system typically renders graphical objects received from the GDI layer of an operating system, generating pixels. Rendering is the process by which graphical objects received from the GDI layer are converted to pixels by a graphics rendering system. The pixels generated by the graphics rendering system are then sent to an output device for display and/or printing.

FIG. 1 shows the relationship between a conventional software application 110, a graphics device interface layer 120, a graphics rendering system 130 and a target device 140. The application 110 passes each page of a document as a series of commands. For each page to be rendered, the series of commands are defined in terms of graphic interface services which describe the graphical objects of the page. The GDI layer 120 mediates between the application program 110 and the target device 140. The GDI layer 120 enables the graphics rendering system 130 to support a much smaller set of functionality than the Windows™ operating system can handle. The GDI layer 120 also provides graphical objects to the graphics rendering system 130 in a format that the GDI layer 120 determines is the most efficient for the graphics rendering system 130 and at a resolution of the target device 140. The graphics rendering system 130 then renders the graphical objects received from the GDI layer 120, generating pixels. The pixels generated by the graphics rendering system 120 are then sent to the target device 140.

There are a wide range of graphics software applications. Many of these graphics software applications are capable of producing complex graphical objects. These objects are usually specific to a particular graphics software application. For example, one well known graphics software application referred to as Corel Draw™ can create a complex object know as a 'fountain fill'. A 'fill' is used to describe pixel data that a graphical object is painted (ie., filled) with. For example, a red square has a red flat coloured fill. A fountain fill is a type of 'gradient fill' which describes the fill of an object where two or more colours of the object flow into each other smoothly. Gradient fills come in many types (eg., linear, conical, radial and non-linear). An object 210 filled with a radial gradient fill is shown in FIG. 2A. A gradient fill transition usually consists of one colour flowing into another. However, more complex gradient fills may have many transitions between many different colours. FIG. 2B shows an example of an object 220 filled with a gradient fill that has many transitions.

The method used by a particular graphics software application for filling an object with a linear gradient fill is dependent on the particular graphics software application. However, one known method of filling an object with a linear gradient fill comprises the step of specifying a start colour and an end colour at each end of the bounding box of a graphical object being filled and interpolating between the start and end colour.

Complex graphical objects such as the objects 210 and 220 are not typically able to be directly rendered by a printer or display driver. Therefore, a GDI layer typically passes gradient fills to a graphics rendering system as a number of flat filled adjacent objects in the form of parallelograms. These flat filled adjacent parallelograms enable the graphics rendering system to render a complex graphical object without the need to support any application specific graphics types. For renderers which use a Painters Algorithm method of rendering, flat filled parallelograms may be rendered to a frame store. However, since both linear and non-linear gradient fills are typically passed by the GDI layer as flat filled parallelograms, the width of any two adjacent parallelograms is not typically consistent. As a result, colour change between consecutive sets of these parallelograms is not always linear.

In some graphics rendering systems, the rendering process is a two-stage process. In such rendering systems, graphical objects of a page to be rendered are firstly converted into an intermediate format before the rendering process begins. This intermediate format is known as a 'display list'. In one such graphics rendering system, the first stage of the rendering process converts each graphical object of the page received from an associated operating system into an intermediate edge-based object. For example, FIG. 3 shows a conventional graphics rendering system 330 that converts each received graphical object into an intermediate edge-based object. In the example of FIG. 3, a linear gradient fill 370 corresponding to a complex graphical object, created by a graphics application 310 is passed to the graphics rendering system 330 from the graphics device interface 320, as a number of flat coloured rectangles (eg., the flat coloured rectangle 380). A display list creation module 340 of the graphics rendering system 330, converts each of the flat coloured rectangles 380 into two edges, a level, and fill data, which are stored in databases (eg., 381, 382 and 383, respectively). The edges describe the area in which each flat coloured rectangle 380 is filled. The fill data provides the colour/opacity of the pixels inside the edges of the flat coloured rectangle 380. The fill data may be a flat colour, a bitmap, an equation or pattern that describes pixel data at a specific position within the flat coloured rectangle

380. The level contains important rendering information such as a z-order for the coloured rectangle 380, the raster operation to be applied to the fill data and whether an associated edge is a clipping edge or a filling edge.

Before the graphics rendering system 330 can render one of the flat coloured rectangles 380, each rectangle must be sorted, such that all edges of a particular rectangle are sorted in ascending y, then ascending x order. The y and x coordinates correspond respectively to the scan lines and pixel locations on each scan line in a rasterized rendering system. The graphics rendering system generates a display list 350 of edges and their associated fill priority (z-order), along with other information such as if an edge is a clipping edge or a filling edge.

A display list 350 is sometimes referred to as a job. The job comprises all of the information needed by a rendering module 360 of the graphics rendering system 330 to render the page. The rendering of the page by the rendering module 360 is the second stage of the rendering process.

The rendering module 360 parses the job and generates pixels for a downstream device such a printer, for each scanline down the page. For each scanline, as the rendering module 360 encounters the left edge of a coloured rectangle (eg., the rectangle 380), the rendering module 360 loads the level associated with the rectangle into an intermediate buffer. The level associated with the rectangle is now said to be active. The level associated with the rectangle is deactivated when the rendering module 360 encounters the right edge of the rectangle.

The rendering module 360 allows for different types of activation rules for edges, which will be explained later in this document. The pixel span between each set of edges on a scanline is rendered according to these rules. When the rendering module 360 encounters an edge, the rendering module 360 determines a top most (ie., greatest z-order position) currently active level and renders the pixels according to the fill data of the top most currently active level. If the object (eg., a flat filled rectangle) corresponding to the top most level is transparent, then compositing of lower z-order levels is used to calculate the resulting pixel data. Every edge the rendering module 360 encounters has to be updated to a new position on a next scanline. In addition, since edges may cross one another, edges must also be sorted to ensure that the edges remain in ascending x order. The rendering process continues on a scanline per scanline basis until all the pixels on the page are rendered.

As described above, complex objects are typically broken down into simpler objects, such as flat filled rectangles, by the graphics device interface 320. Each of these simpler objects has to be converted to the intermediate form separately, which takes considerable time. When rendering each individual flat fill object, each of the edges of the object need to be sorted and each edge updated for every scanline, which is also a time consuming process for the rendering module 360. So, for a complex object that has been broken down into hundreds of simpler objects, converting each object into an intermediate edge based format and rendering the complex object using an edge based rendering module is highly inefficient.

As an example, the horizontal linear gradient fill 230 shown in FIG. 2C may be broken down into two hundred and fifty six (256) flat fill rectangles by the graphics device interface 320 before being passed to the graphics rendering system 330. In the worst case of the gradient fill 230 proceeding left to right or right to left, all two hundred and fifty-six (256) flat fills become active on a scanline, equating to five hundred and twelve (512) edges per scanline. Hence for an edge-based rendering system, such a method of rendering is considerably inefficient, due to the large amount of edge sorting and tracking that needs to be performed per scanline. In addition, each flat fill must be stored into an intermediate object-graphics format, accessed for each fill-path for each scanline and then all of the edges sorted before rendering can begin.

The above rendering method requires large amounts of memory accesses and can also consume large amounts of fill resources when the number of flat fills to be processed is in the order of thousands. Such numbers of flat fills can occur frequently when printing pages larger than A3 at high-resolutions.

One way to increase the rendering performance of the edge based rendering module 360, when rendering the gradient fill 230, is to reduce the number of edge updates and the amount of edge sorting that needs to be carried out. One known method of reducing edge updates and sorting is to remove redundant edges where possible by compiling graphical objects into a larger single graphic object or into a more complex object that a rendering module can handle. There are a number of known methods for compiling graphical objects into a larger single graphical object. For example, two separate adjacent bitmaps may be stitched together to form one large bitmap, two contiguous flat fills with the same colour may be combined to produce one larger single flat fill, and contiguous flat fill primitives representing a linear gradient fill may be combined into a complex linear gradient fill of a type that can be rendered by a graphics rendering system. However, these known rendering methods of rendering all have disadvantages and limitations.

For example, known rendering methods that attempt to combine contiguous objects are limited to specified fill types available to a particular rendering module. Therefore, the only objects that can be combined are those that have the exact same fill type as each other. These types of objects do not occur often since a GDI layer such as the GDI 320 has no need to break these objects down in the first place.

For those methods that combine bitmaps, whole image fill data has to be copied to combine two different bitmaps into one bitmap. Copying image fill data can be a slow process, especially when a number of bitmaps are involved as a large number of memory allocations and a large amount of image data copying needs to be performed.

Those methods of rendering that combine flat fill primitives into complex equivalents are limited to outputting fills that are supported by a particular rendering module. One fill that is likely to be supported by a particular rendering module is a linear gradient fill, which is usually represented by two or three points and corresponding colour values at those points.

As described earlier, it is not atypical for the GDI 320 to pass a gradient fill as a number of flat filled parallelograms, with inconsistent parallelogram widths and non-constant colour changes. For gradient fills that are not linear, (eg., a non-linear gradient fill 510 as shown in FIG. 5A), known rendering methods attempt to combine the individual flat fill parallelograms into equivalent linear gradient components. Known rendering methods that compile non-linear gradient fill objects into linear gradient fills ideally produce two linear gradient fills. FIG. 5B shows two linear gradient fills 520 and 525, produced from the non-linear gradient fill 510 of FIG. 5A. Due to non constant colour changes and inconsistent parallelogram widths produced by the GDI 320 given the non-linear gradient fill 510, the known method of compiling gradient fills does not produce the ideal results of FIG. 5B since such a method cannot deal with inconsistencies within the gradient fill 510.

Conventional rendering methods often produce a large number of linear gradient fills 530-537, as shown in FIG. 5C. Producing such a large number of linear gradient fills can be less efficient than an original flat fill representation, ultimately slowing a rendering module down. The rendering module is slowed down because linear gradient fill pixel data is more difficult to calculate than that of a flat fill and since only a minimal number of edges are typically removed, the net effect is actually a slow down in rendering speed. Flat fills (eg., the flat fill rectangle 380) representing a gradient fill that arrive from the GDI 320 are not always consistent and do not always have reasonable linear colour change limits. Conventional methods of rendering are therefore very limited in handling flat fills in an efficient manner. Further, conventional rendering methods lack the ability to fully optimise graphic primitives because an associated rendering module lacks the available functionality.

A further disadvantage of rendering linear gradient fills occurs due to the fact that printers use subtractive primary colours cyan, magenta and yellow (CMY) and also black (K) to produce colour images on a page. As a result, it is necessary to convert a linear gradient fill stored in the RGB colour space to the CMYK colour space. The conversion of a linear gradient fill from the RGB colour space to the CMYK colour space can be done within a host computer or at a target device. However, a linear gradient fill that is described in terms of two or three points, each point having a corresponding colour value in the RGB colour space, can not be colour converted by simply converting the colour at each point since original colour data, passed by a GDI, does not map linearly into the colour converted colour space. That is, there is no linear relationship between the RGB colour space and the CMYK colour space. Conventional methods of colour converting a linear gradient fill, determine RGB values of pixel data for each pixel within the fill. Each of the pixels within the linear gradient fill are then converted into an equivalent CMYK colour value. The colour converted linear gradient fill is then added to a display list as a bitmap. Therefore, storing a linear gradient fill in the RGB colour space is very inefficient.

Thus, a need clearly exists for a more efficient method of rendering graphical objects.

SUMMARY

It is an object of the present invention to substantially overcome, or at least ameliorate, one or more disadvantages of existing arrangements.

According to one aspect of the present invention there is provided a method of rendering a plurality of graphical objects, each of said graphical objects comprising a predetermined object outline, a predetermined z-order, and an associated fill, the object outline for a particular object defining an area in which said particular object is filled, said method comprising the steps of:

combining each of said objects to form a grouped object, said grouped object comprising a grouped object outline and an associated compound fill, said compound fill comprising one or more fill data structures representing the fills associated with said graphical objects; and rendering said grouped object according to said grouped object outline, wherein one or more fills used to render said grouped object are determined according to said compound fill.

According to another aspect of the present invention there is provided a compound fill for rendering a graphical object, said graphical object comprising a predetermined object outline and said compound fill, the predetermined object outline defining an area in which said graphical object is filled, wherein said compound fill is configured as a data structure containing a plurality of fills, said fills defining a manner in which said graphic object is to be filled upon rendering.

According to still another aspect of the present invention there is provided an apparatus for rendering a plurality of graphical objects, each of said graphical objects comprising a predetermined object outline, a predetermined z-order, and an associated fill, the object outline for a particular object defining an area in which said particular object is filled, said apparatus comprising:

combining means for combining each of said objects to form a grouped object, said grouped object comprising a grouped object outline and an associated compound fill, said compound fill comprising one or more fill data structures representing the fills associated with said graphical objects; and rendering means for rendering said grouped object according to said grouped object outline, wherein one or more fills used to render said grouped object are determined according to said compound fill.

According to still another aspect of the present invention there is provided a computer program for rendering a plurality of graphical objects, each of said graphical objects comprising a predetermined object outline, a predetermined z-order, and an associated fill, the object outline for a particular object defining an area in which said particular object is filled, said program comprising:

code for combining each of said objects to form a grouped object, said grouped object comprising a grouped object outline and an associated compound fill, said compound fill comprising one or more fill data structures representing the fills associated with said graphical objects; and code for rendering said grouped object according to said grouped object outline, wherein one or more fills used to render said grouped object are determined according to said compound fill.

According to still another aspect of the present invention there is provided a computer program product including a computer readable medium having recorded thereon a computer program for rendering a plurality of graphical objects, each of said graphical objects comprising a predetermined object outline, a predetermined z-order, and an associated fill, the object outline for a particular object defining an area in which said particular object is filled, said program comprising:

code for combining each of said objects to form a grouped object, said grouped object comprising a grouped object outline and an associated compound fill, said compound fill comprising one or more fill data structures representing the fills associated with said graphical objects; and code for rendering said grouped object according to said grouped object outline, wherein one or more fills used to render said grouped object are determined according to said compound fill.

Other aspects of the invention are also disclosed.

BRIEF DESCRIPTION OF THE DRAWINGS

Some aspects of the prior art and one or more embodiments of the present invention are described with reference to the drawings and appendices, in which:

FIG. 7A shows an original edge based object;

FIG. 7B shows the object of FIG. 7A stored in a conventional manner as fills, edges and levels;

FIG. 7C shows the object of FIG. 7A stored as a compiled object represented by fills, edges and a level;

FIGS. 15A to 15E show some examples of objects which may be combined;

FIGS. 15F and 15G show some examples of objects are not able to be combined.

DETAILED DESCRIPTION INCLUDING BEST MODE

Figure 1:
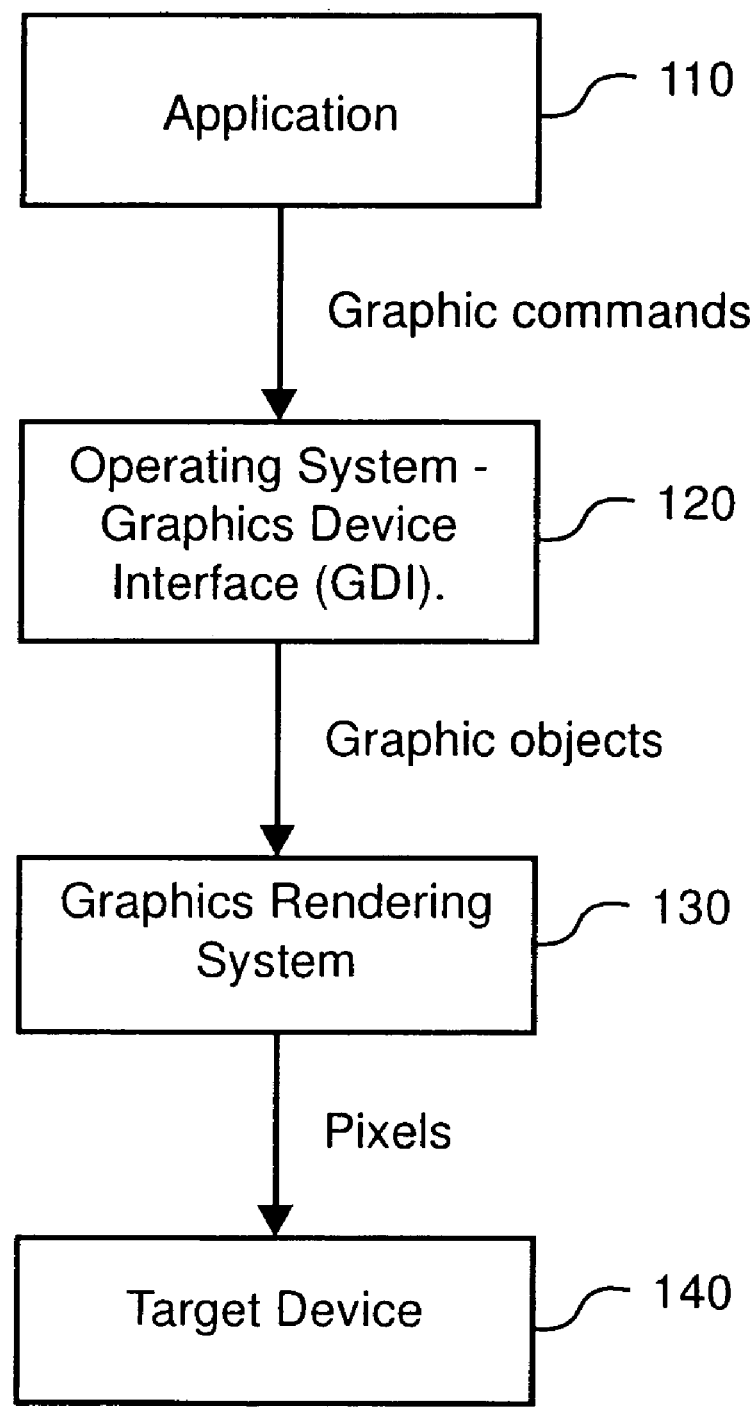
FIG. 1 shows conventional relationship between a conventional software application, a graphics device interface layer, a graphics rendering system and a target device.
Figure 2A:
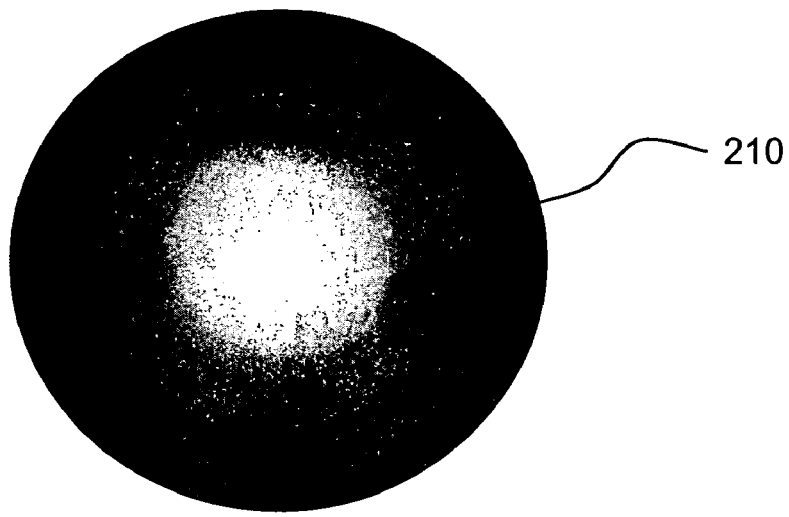
FIG. 2A shows an example of a radial gradient fill.
Figure 2B:
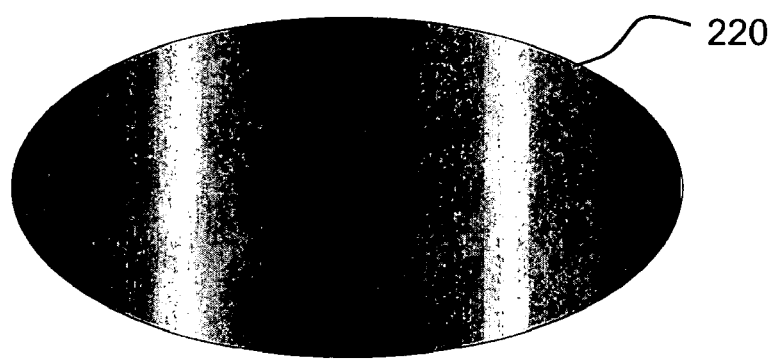
FIG. 2B shows an example of a non-linear gradient fill.
Figure 2C:
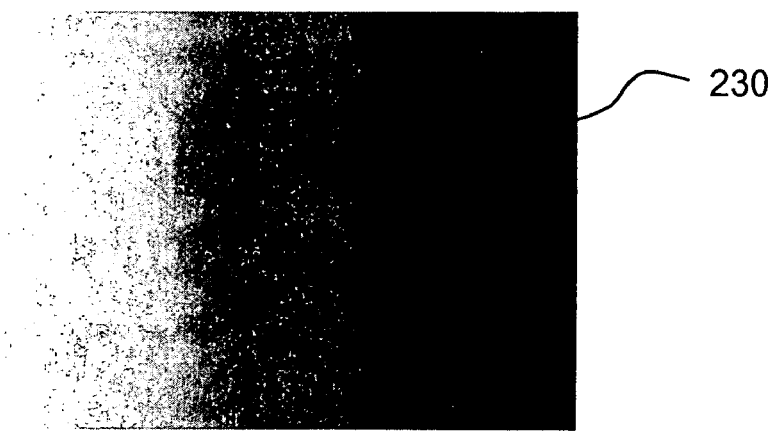
FIG. 2C shows an example of a linear gradient fill.
Figure 3:
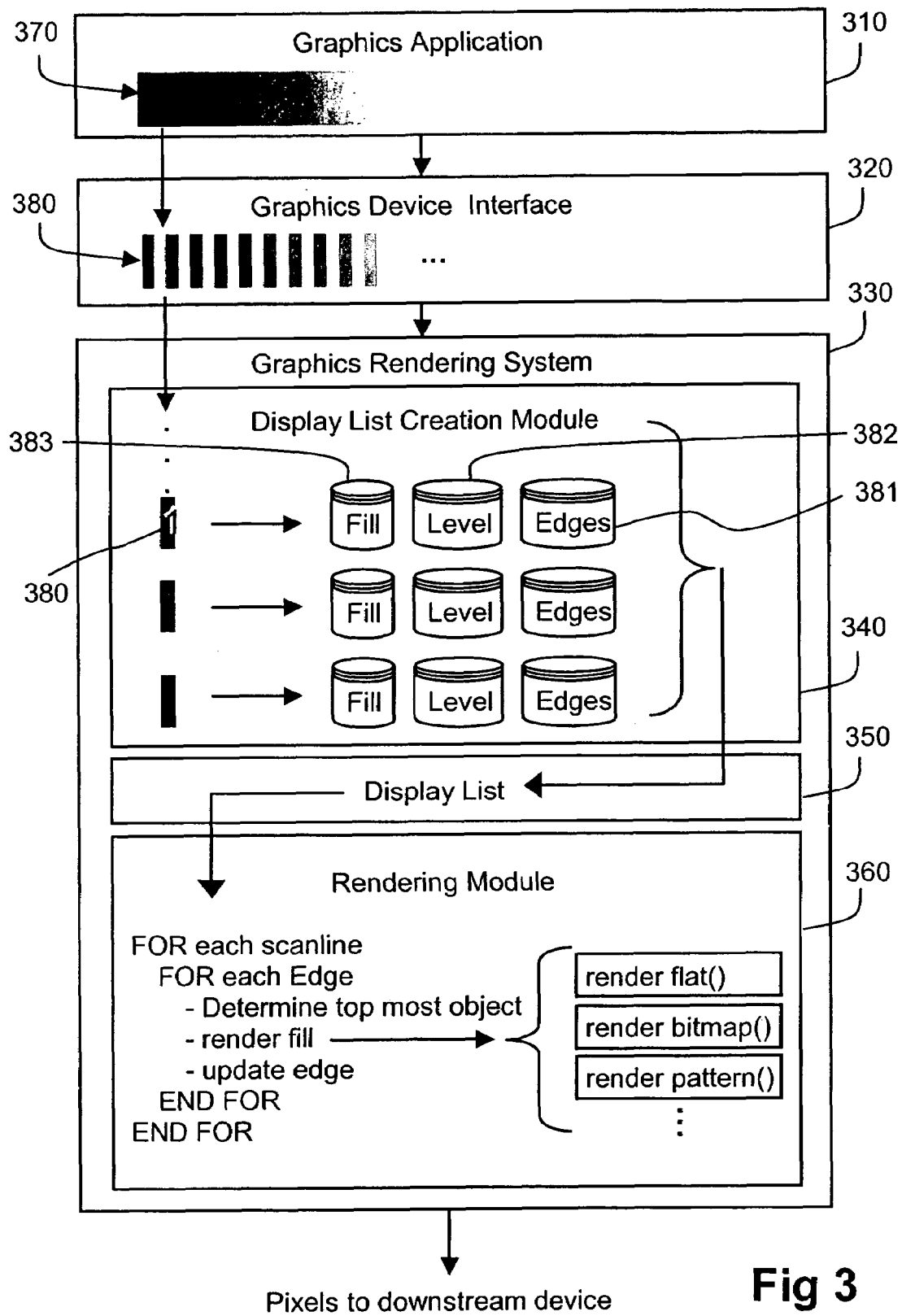
FIG. 3 shows a conventional graphics rendering system.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

A method 900 (see FIG. 9) of combining a plurality of objects is described below with reference to FIG. 1 to 16. The method 900 efficiently combines a set of contiguous graphical objects to generate a high level compiled object representing the combination of the contiguous objects. The compiled object may also be referred to as a "grouped" object. The method 900 may be used to combine such contiguous objects even if the objects have different fill types. The method 900 outputs the compiled object to a display list.

The compiled object has an associated meta-fill. The meta-fill is a compound fill, which may be used to describe a collection of fills associated with the compiled object. As will be described in detail below, the meta-fill comprises a head structure to define information about the meta-fill. The head structure is followed by a linked list of fill structures that describe the fills of the compiled object. A plurality of the fills of the compiled object may be combined into one simple compound or complex fill in order to minimise size of the linked list.

A meta-fill may be used to combine a set of simple primitive objects (primitives) lying side by side to form a complex primitive object, such that only two edges are required to represent the set of primitives. The meta-fill reduces rendering time by re-uniting complex drawing objects, such as non-linear blends the graphics interface has represented by numerous flat fills. For example, a meta-fill similar to the non-linear gradient fill 510 may be formed from the linear gradient fills 530-537 of FIG. 5C. Such a meta-fill is a great improvement over the linear gradient files 530-537 of FIG. 5C.

Meta-fills do not alter information provided by a GDI such as the GDI 320, for example. However, a meta-fill will remove occluded parts of an object when two objects overlap. Substantially, no information is lost in the conversion of fills to a meta-fill. All of the information of one or more primitive fills used to form a meta-fill is retained to ensure that drawing output remains consistent and is not affected when the primitive fills are combined into the meta-fill. In contrast, conventional methods affect color information such that output is never guaranteed to reflect input. Meta-fills also reduce edge overhead.

For rendering systems that produce PDLs, a meta-fill reduces the size of a PDL required to represent primitive objects. Reducing the size of a PDL improves processing where transmission of the PDL is required.

A meta-fill may be formed using flat fills, linear gradient fills, and bitmaps. In contrast, conventional rendering systems typically only recognise flat fills representing color blends.

The compiled object may be efficiently rendered using the associated meta-fill by decoding the meta-fill in real time. A method 1000 (see FIG. 10) of rendering a compiled object is also described with reference to FIG. 1 to 16.

Figure 4:
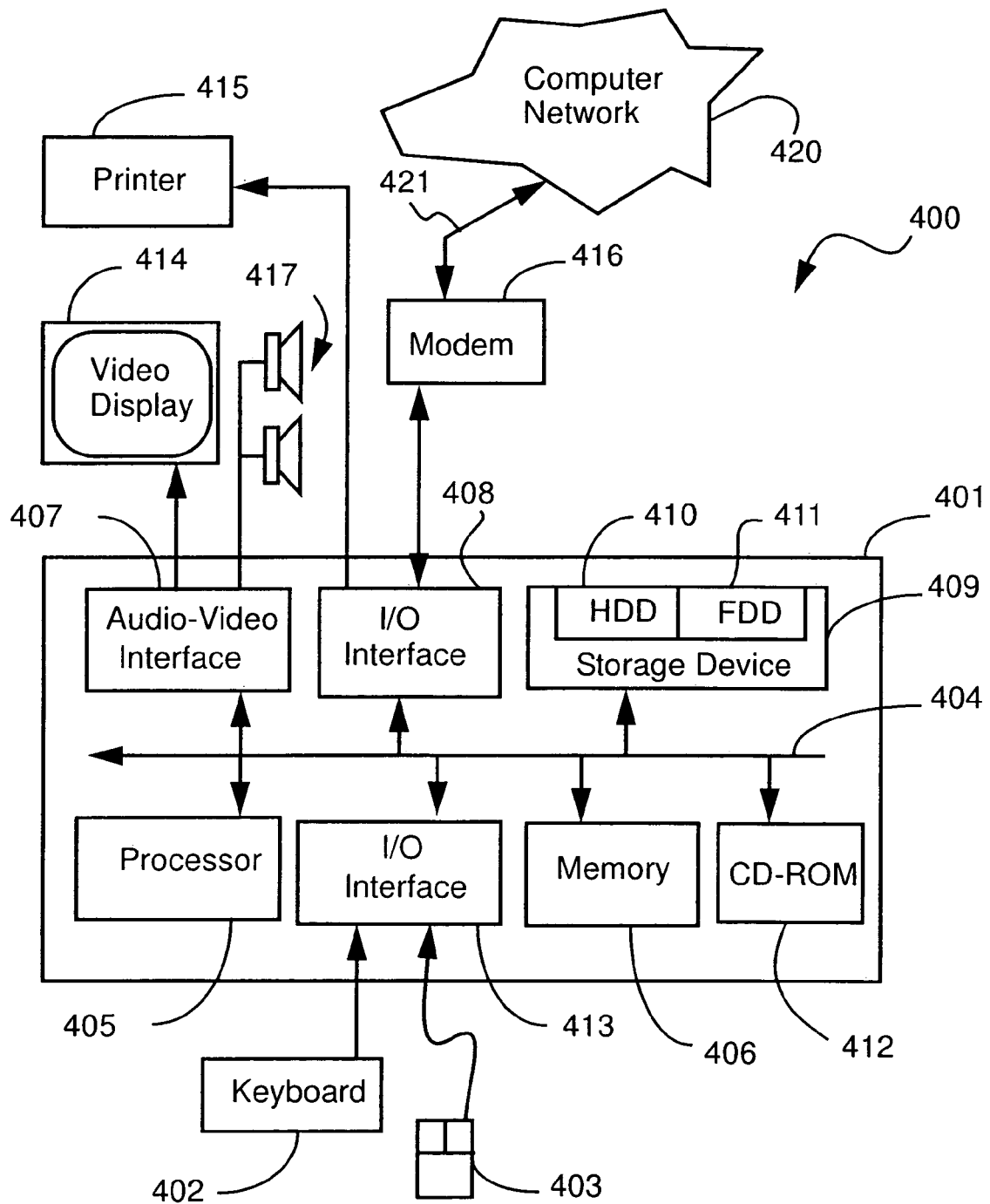
FIG. 4 is a schematic block diagram of a general purpose computer upon which arrangements described can be practiced.
Figure 5A:
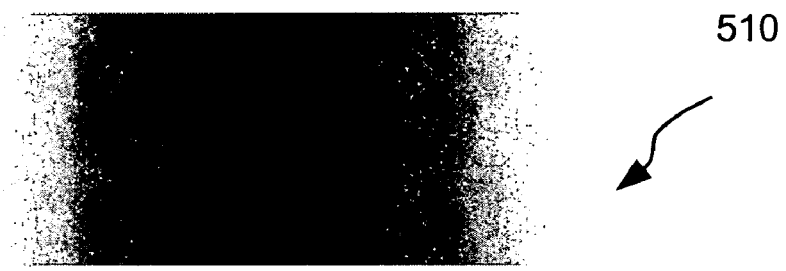
FIG. 5A shows a non-linear gradient fill.
Figure 5B:
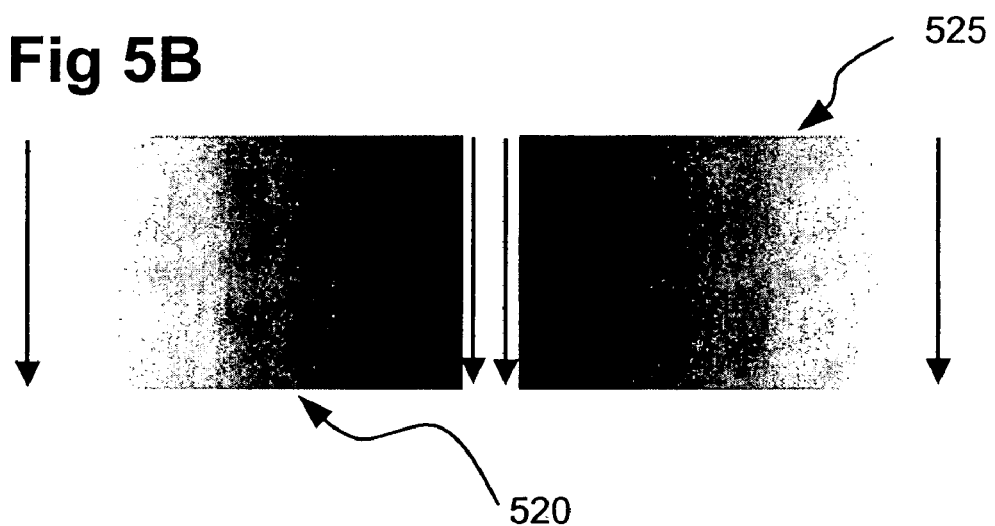
FIG. 5B shows two linear gradient fills produced from the non-linear gradient fill of FIG. 5A.
Figure 5C:
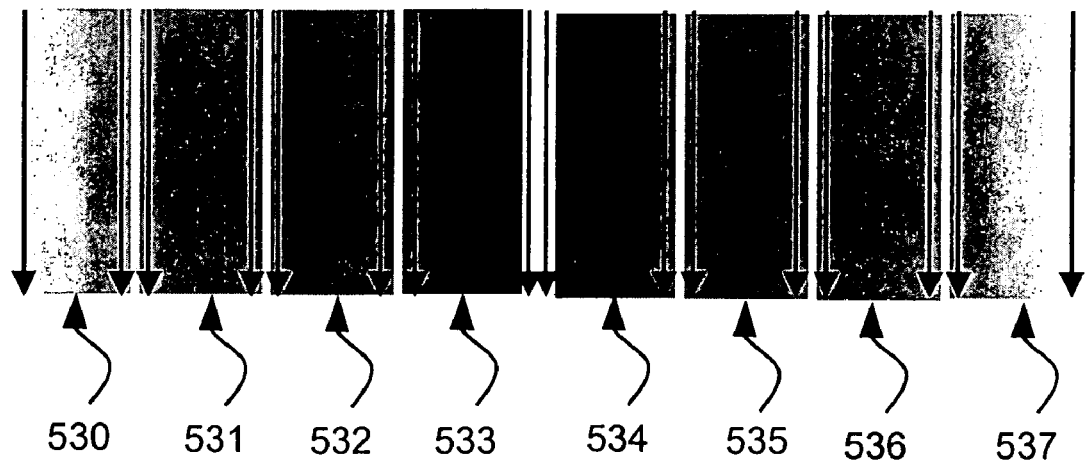
FIG. 5C shows a number of linear gradient fills.

The methods described herein may be implemented using a general-purpose computer system 400, such as that shown in FIG. 4 wherein the processes described with reference to FIGS. 1 to 16 may be implemented as software, such as a code module executing within the computer system 400. In particular, the steps of the described methods are effected by instructions in the software that are carried out by the computer. The instructions may be formed as one or more code sub-modules, each for performing one or more particular tasks. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the described methods.

The computer system 400 is formed by a computer module 401, input devices such as a keyboard 402 and mouse 403, output devices including a printer 415, a display device 414 and loudspeakers 417. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN), and may be incorporated into the computer module 401 in some implementations.

The computer module 401 typically includes at least one processor unit 405, and a memory unit 406, for example formed from semiconductor random access memory (RAM) and read only memory (ROM). The module 401 also includes an number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the modem 416 and printer 415. In some implementations, the modem 416 may be incorporated within the computer module 401, for example within the interface 408. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations or alike computer systems evolved therefrom.

Typically, the code module is resident on the hard disk drive 410 and read and controlled in its execution by the processor 405. Intermediate storage of the module and any data fetched from the network 420 may be accomplished using the semiconductor memory 406, possibly in concert with the hard disk drive 410. In some instances, the code module may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable media. The term "computer readable medium" as used herein refers to any storage medium that participates in providing instructions and/or data to the computer system 400 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of transmission media that may be used to transmit the program include radio or infra-red transmission channels as well as a network connection to another computer or networked device, and the Internet or Intranets including e-mail transmissions and information recorded on Websites and the like.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 6:
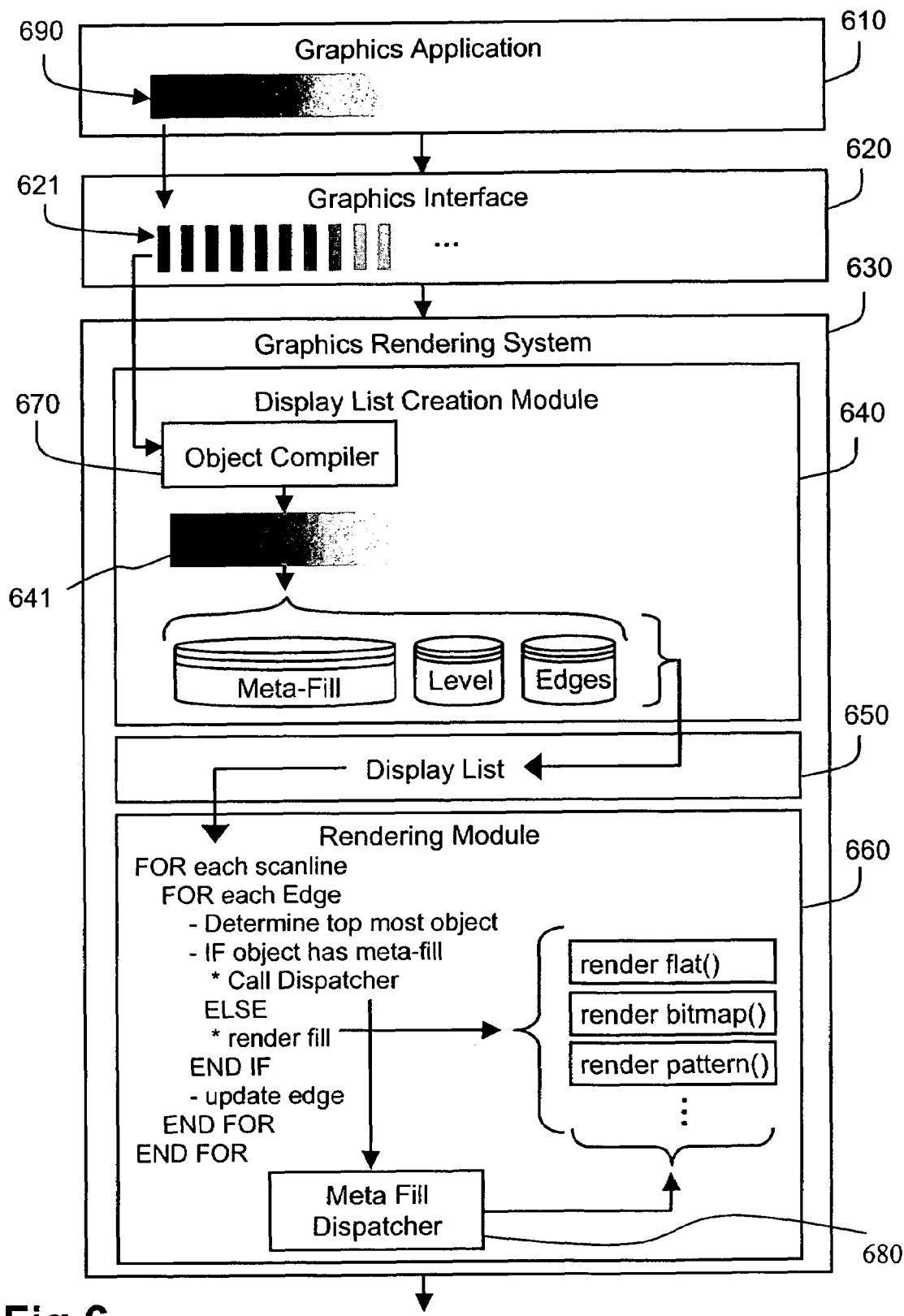
FIG. 6 shows a two-stage edge based graphics rendering system.

The method 900 may be used to combine contiguous graphical objects whether the graphical objects are originally from a complex object, two objects that lie side by side or two objects that overlap. FIG. 6 shows an example of a two-stage edge based graphics rendering system 630, which may be used to implement the method 900 and the method 1000. The graphics rendering system 630 may be used to render a linear gradient fill such as the linear gradient fill 690 seen in FIG. 6. The graphics rendering system 630 comprises an object compiler 670 and meta-fill dispatcher 680. The graphics rendering system 630 also comprises a display list creation module 640, a display list 650 and a rendering module 660. A graphics device interface 620, as shown in FIG. 6, receives a linear gradient fill 690 from a graphics application 610 and passes the linear gradient fill 690 as a number of adjacent flat-filled objects (eg., parallelogram 621) to the graphics rendering system 630.

The object compiler 670 may be used to combine adjacent, overlapping or contiguous objects and, if suitable, form a compiled object together with an associated meta-fill, thereby removing edges in between such objects. Once the compiler 670 has determined that no more objects may be combined into a current compiled object, then the compiler 670 may convert the compiled object into edges, a level and an associated meta-fill. The compiled object may then be placed into a current display list 650.

The rendering module 660 comprises a dispatcher 680. The rendering module 660 decodes meta-fill data and generates fill information, which may be used to render one or more pixel spans within the compiled object 641.

Figure 9:
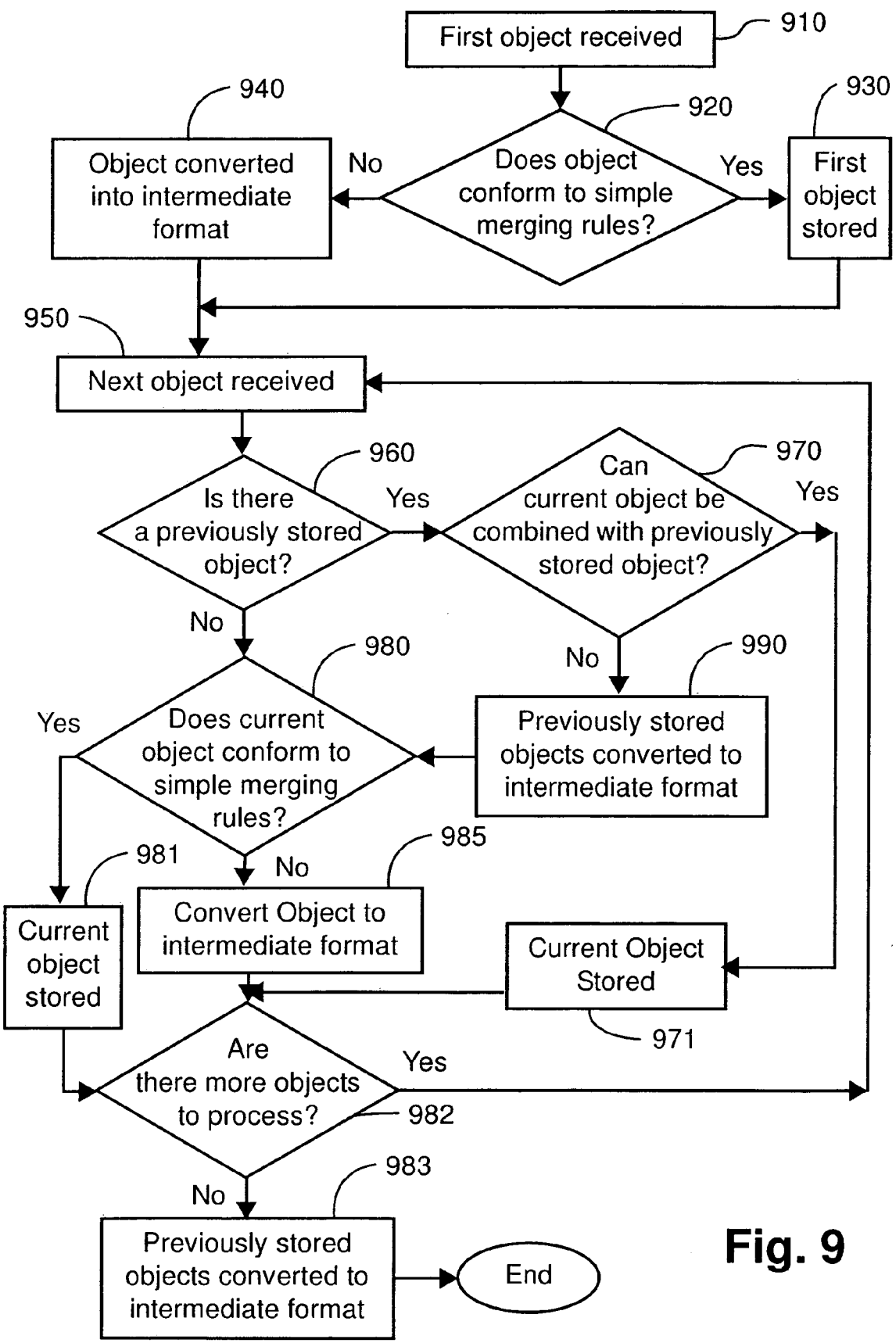
FIG. 9 shows a method of combining a plurality of objects to generate a compiled object.

The method 900 of combining a plurality of objects will now be described with reference to FIG. 9. The method may be implemented as software resident on the hard disk drive 410 and being controlled in its execution by the processor 405. The method 900 may be implemented as one or more software modules of the compiler 670. The objects may be received by the compiler 670 from a graphics interface, such as the graphics interface 620, in ascending z-order.

The method 900 begins at step 910, where the processor 405 executing the compiler 670, detects a current object received from the graphics device interface 620. At the next step 920, the processor 405 determines if the current object conforms to simple merging rules. These rules are:
 (i) The object has two parallel, non-coincident straight sides;
 (ii) The object does not go outside the area between the indefinite extension of the two parallel sides identified in (i).

If the current object satisfies these rules, the current object may be merged. If the current object may be merged, then the method 900 proceeds to step 930. Otherwise, the method 900 proceeds to step 940.

At step 930 the processor 405 stores the current object in memory 406. The current object is not converted into an intermediate format at this point. The method 900 then proceeds to step 950 and the object received at step 910 becomes a "previously stored" object.

At step 940, the processor 405 converts the current object into an edge-based format, and the method 900 continues to step 950. At the next step 950, the processor 405 receives a next object from the graphics device interface. The object received at step 950 becomes the "current" object. At this point there may or may not be a "previously stored" object, depending on the path that was previously taken through the flow chart.

The method continues at the next step 960, where if the processor 405 determines that there is a previously stored object, then the method 900 proceeds to step 970. Otherwise, the method 900 proceeds to step 980.

At step 970, the processor 405 determines if the current object may be combined with the previously stored object, by firstly determining if the current object conforms to the simple merging rules mentioned above with respect to step 920 . . . . If so, then the processor 405 determines if the current object and the previously stored object satisfy predetermined criteria. The predetermined criteria of step 970 are as follows:

(i) the parallel sides of both the current object and the previously stored object are at the same angle; and
(ii) the current object and the previously stored object overlap over the whole length of the parallel sides of the objects or abut one another on those parallel sides.

FIGS. 15A to 15E show some examples of objects (eg., 1511) satisfying the above predetermined criteria and which therefore may be combined. FIG. 15A shows objects 1511 and 1510 which satisfy the above criteria. The objects 1511 and 1510 do not require a path to be formed in order to describe a resulting outline 1512. The outline 1512 may be represented by four points. Similarly, FIG. 15B shows objects 1520 and 1522 which satisfy the above criteria and do not require a path to describe a resulting outline 1521. Again, the outline 1521 may be represented by four points.

FIG. 15C shows objects 1530 and 1532 which satisfy the above predetermined criteria and which may be combined. The objects 1530 and 1532 require a path to be formed to describe a resulting compiled object 1531. Similarly, FIG. 15D shows objects 1540 and 1542 which satisfy the above predetermined criteria and which may be combined. The objects 1540 and 1542 require a path to be formed to describe a resulting compiled object 1541. Similarly, FIG. 15E shows two objects 1550 and 1552 which satisfy the above predetermined criteria and which may be combined. The objects 1550 and 1552 require a path to be formed to describe a resulting compiled object 1551.

In contrast, FIGS. 15F and 15G show some examples of objects (eg., 1571) which do not satisfy the above predetermined criteria and are not able to be combined. FIG. 15F show examples of objects 1560 and 1561 that cannot be combined since the objects 1560 and 1561 do not satisfy the above criteria. In particular, the objects 1560 and 1561 fail the second of the simple merging rules by going outside the area bounded by their parallel (horizontal) sides. Similarly, FIG. 15G show examples of objects 1570 and 1571 that cannot be combined since the objects 1570 and 1571 do not satisfy the above criteria. In particular, the objects 1570 and 1571 fail the first of the simple merging rules by not having two non-coincident sides that are parallel.

If the current object and the previously stored object satisfy the predetermined criteria of step 970, then the method 900 proceeds to step 971. At step 971, the current object is stored in memory 406 alongside the previously stored object. Preferably, the current object is merged with the previously stored object if their fills consist of the same, flat colour. If the current object and the previously stored object cannot be combined at step 970, then the method 900 proceeds to step 990.

At step 990, since the current object cannot be combined with the previously stored object, all previously stored objects are combined to form a compiled object, and the compiled object is converted into the intermediate edge-based graphics format and the method 900 then proceeds to step 980. In step 990, when converting the object to the intermediate format, the method 900 stores fill lengths within a meta-fill structure configured within memory 406. The fill lengths correspond to the horizontal run lengths of the individual fills of the previously stored object(s). If there are more than one previously stored objects, the compiler 670 preferably generates a meta-fill at step 990 by creating a linked list of primitive fill data structures that describe the fills within the meta-fill.

Figure 11:
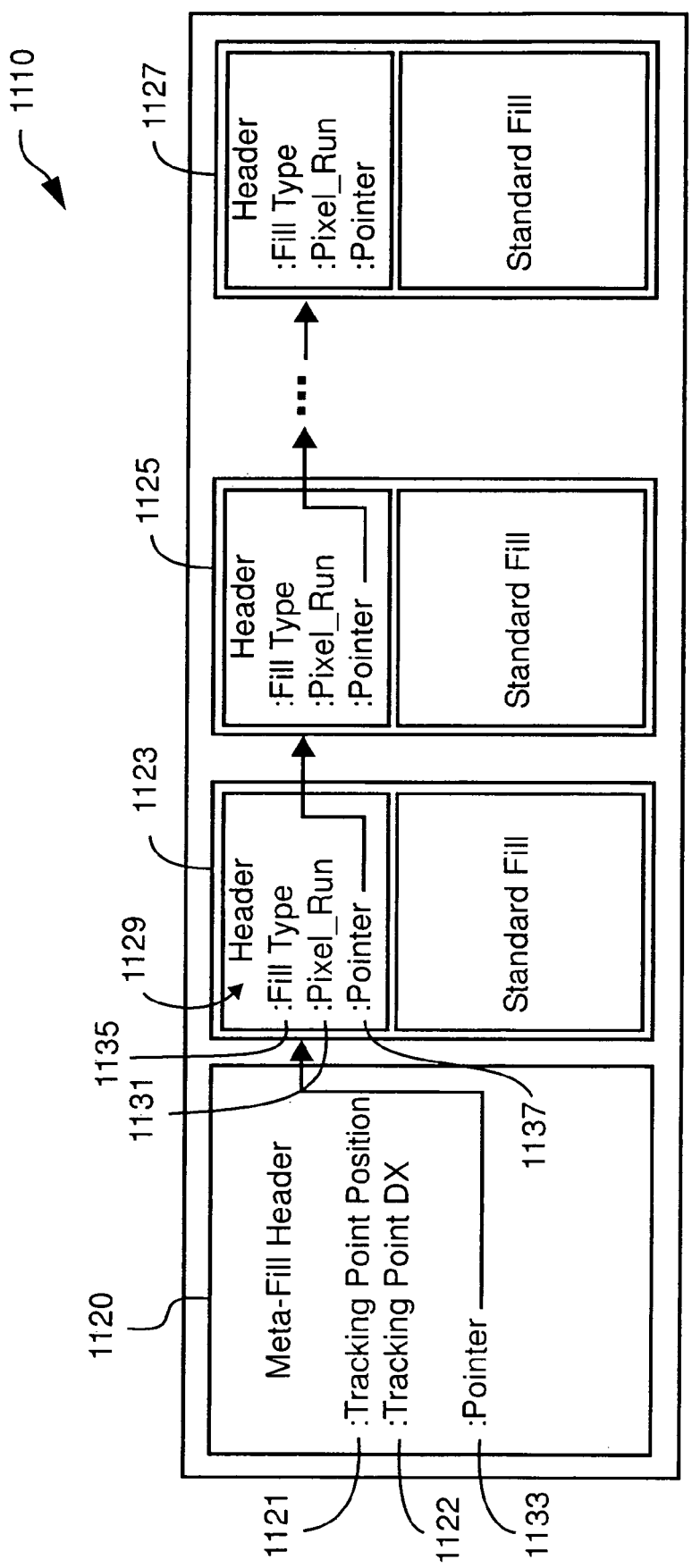
FIG. 11 is a schematic diagram showing a meta-fill.

FIG. 11 shows a meta-fill 1110 in detail. The meta-fill 1110 comprises all of the data necessary to recall a particular fill entry at any point within a compiled object. The meta-fill 1110 comprises a header 1120. The header 1120 comprises a tracking point 1121 and a tracking point DX 1122. The tracking point 1121 may be used to indicate a starting location of a first fill 1123 within the meta-fill 1110 for a specified scanline. The starting location of a first fill within the meta-fill 1110 for a specified scanline enables the compiled object associated with the meta-fill 1110 to be rendered as will be described in more detail below. The tracking point 1121 is updated for a current scanline according to the tracking point DX 1122. The tracking point DX 1122 represents the slope of parallel sides of objects that were originally grouped to form the compiled object represented by the meta-fill 1110. The tracking point is set to be the intersection of the leftmost parallel side of the object with the topmost scanline on which the object exists. The tracking point DX 1122 may be used by the dispatcher 680 to track the location of a first fill within the meta-fill 1110. If the position of the first fill within the meta-fill is known then all other fills of the compiled object may be determined. The header 1120 also comprises a pointer 1133 to the next fill 1123.

Individual primitive fills 1123 are attached to the header 1120 as a linked list. Each of the individual fills are linked to one another, and each primitive fill comprises a header (eg., header 1129). The header 1129 comprises at least a size variable 1131 representing the length of a pixel run for the particular fill within the meta-fill 1110. The size variable 1131 is used by the dispatcher 680 when rendering the meta-fill 1110 to pixels, and ensures that correct sized pixel runs are output for each fill within the meta-fill 1110 as will be explained in more detail below. The compiler 670 determines the pixel lengths of each individual fill within the meta-fill 1110 by simply determining a horizontal distance between the parallel sides of each object added to the meta-fill 1110. The header 1129 also comprises a fill type 1135 and associated parameters and a pointer 1137 to the next fill 1125. Once the meta-fill 1110 has been generated, the meta-fill 1110 is added to a display list along with the edges and level data for a compiled object.

In other embodiments other data structures such as tables or arrays could be used for the meta-fill.

Note that the level of the compiled object created in step 990 is equal to the level of the earliest (lowest level) previously stored object.

The method 900 continues at the next step 980, where the processor 405 determines if the current object conforms to the simple merging rules, as in step 920. If the current object was previously assessed at step 970 and it was determined that the current object may be merged with another object, then the processor 405 may use the result of that analysis to determine if the current object may be merged. If the processor 405 determines that the current object may be merged with another object at step 980, then the method 900 proceeds to step 981. Otherwise, the method 900 proceeds to step 985 where the current object is converted to the intermediate format. Execution then proceeds to step 982.

At step 981, the current object is stored in memory 406. Then at the next step 982, if there are no more objects for the graphics rendering system 630 to process then the method 900 proceeds to step 983. Otherwise the method 900 returns to step 950. At step 983, all previously stored objects are combined to form a compiled object, as in step 990, and the compiled object is converted into the intermediate edge-based format with an associated meta-fill.

Figure 12:
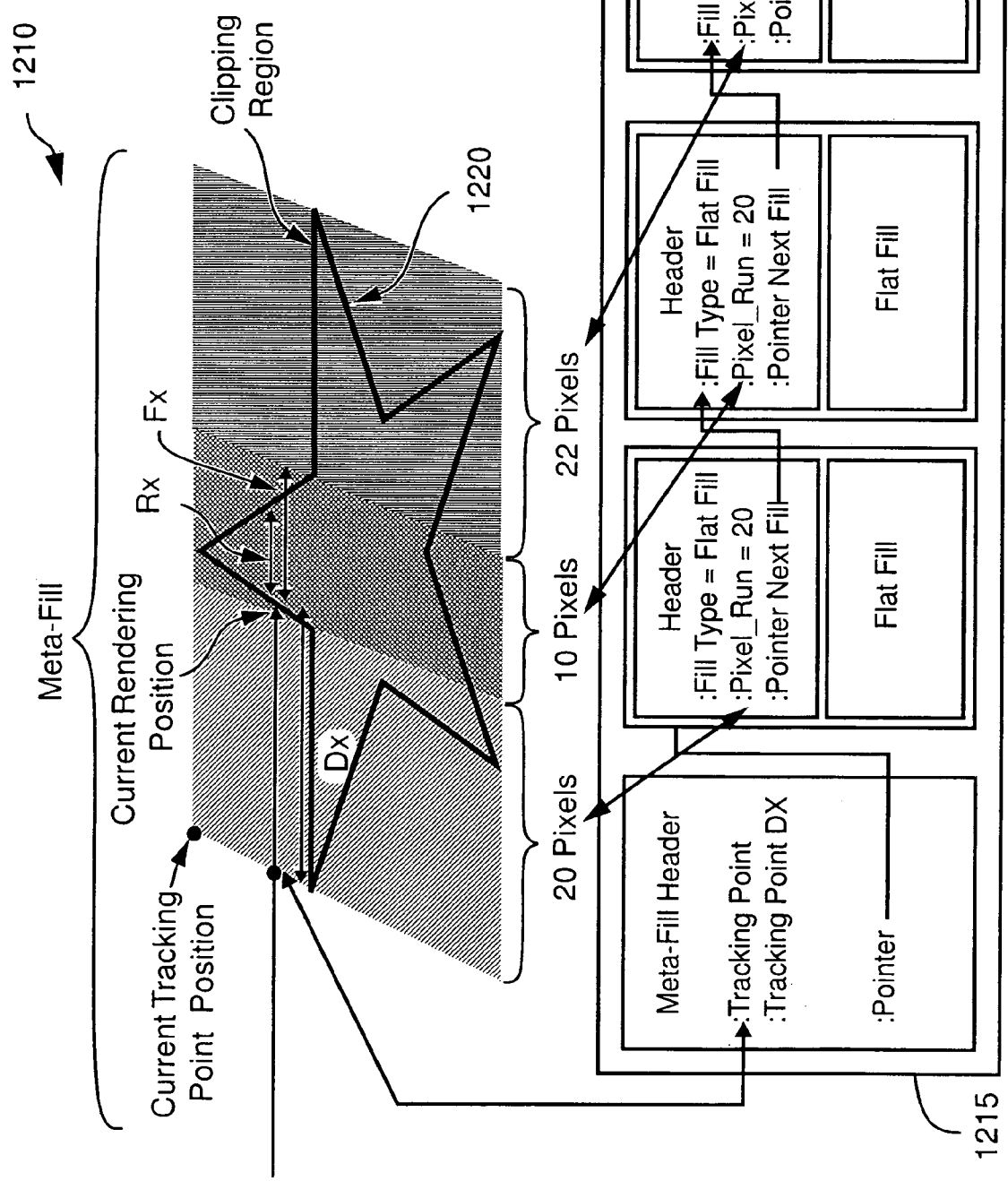
FIG. 12 shows an example of an object which is compiled with an associated meta-fill.

Edge and level data for the compiled object are determined at step 990 and/or 983 from the outline of the compiled object and not the properties of the individual objects (ie., the previously stored objects). Instead of a standard primitive fill, a meta-fill is used to describe the fill data within the compiled object. FIG. 12 shows an example of a compiled object 1210 and an associated meta-fill 1215.

FIG. 7A shows an original edge based object 710. FIG. 7B shows the object 710 stored in a conventional manner as fills 720, edges 722 and levels 724. In contrast, the object 710 may be stored as a compiled object represented by fills 730, edges 732 and a level 734, as shown in FIG. 7C. The edges 732 and level 734 of FIG. 7C representing the original object 710 require less memory than the edges 722 and levels 724 of FIG. 7B.

The dispatcher 680 of the rendering module 660 determines which fill is to be rendered for a specific pixel and scanline position. When a top most active level is to be rendered has a meta-fill associated with the level, the dispatcher 680 may be used to decode the meta-fill.

As described above, a meta-fill comprises a tracking point 1121 that is tracked by the dispatcher 680. The tracking point 1121 moves parallel to the parallel sides of objects that were originally combined. Using the tracking point 1121 the dispatcher 680 may determine which fill to use within the meta-fill 1110 for any position within a compiled object being rendered.

When all or part of a compiled object is to be rendered, rendering information representing the compiled object is passed to the dispatcher 680. The dispatcher 680 uses a current x-position of the rendering module 660, the tracking point 1121 for the compiled object and the pixel widths of the individual fills (eg., 1123) within the meta-fill 1110 to determine a current fill and the number of pixels to be rendered from the current fill. The x position within the meta-fill 1110 may not necessarily correspond to the same point on a scanline as the tracking point 1121, since there may be other objects occluding the meta-fill 1110 or the meta-fill 1110 may contain a clip object. For example, FIG. 12 shows the compiled object 1210 with a clipping region 1220.

Figure 10:
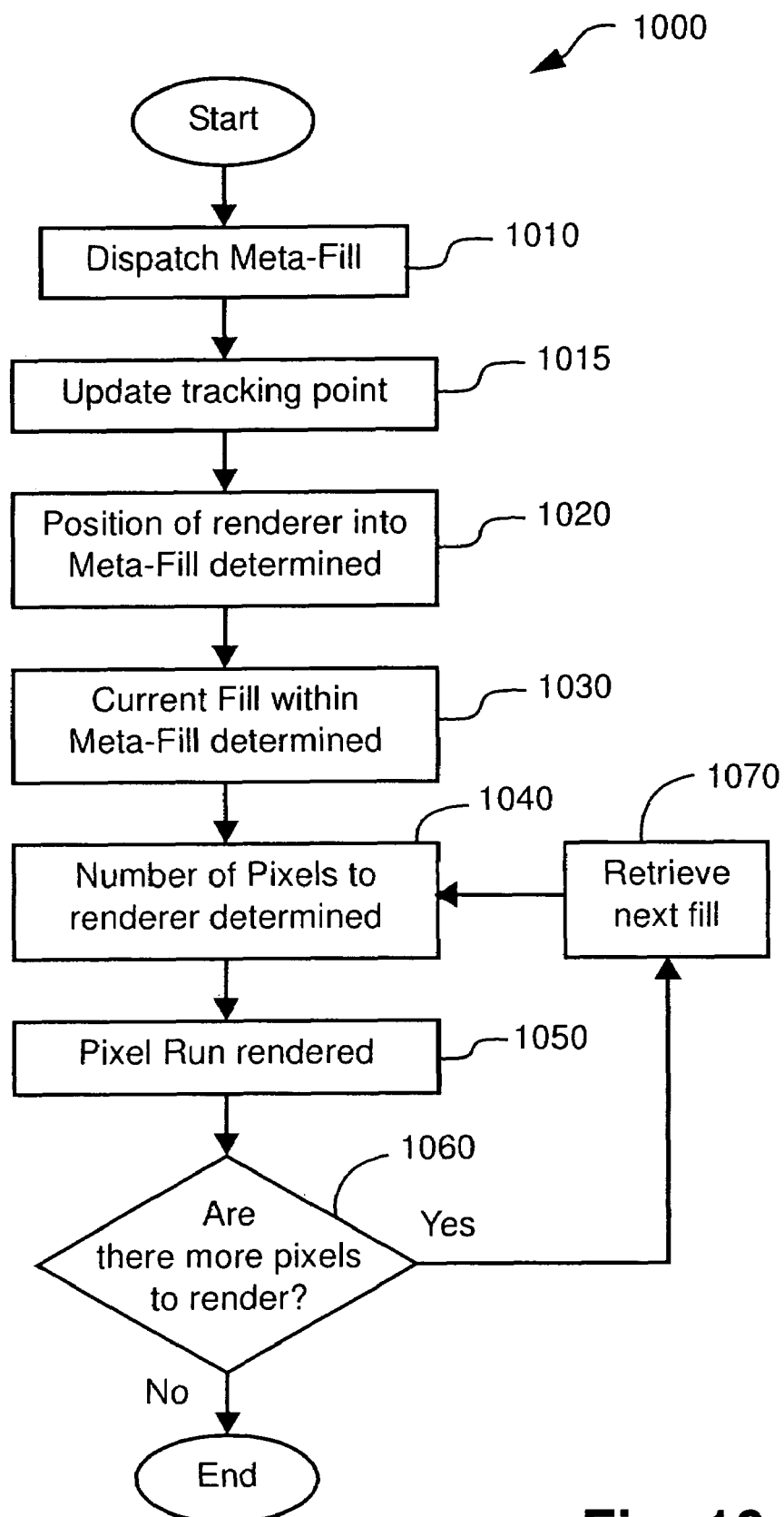
FIG. 10 is a flow diagram showing a method of rendering a compiled object.

FIG. 10 is a flow diagram showing a method 1000 of rendering a compiled object. The method 1000 may be implemented as software resident on the hard disk drive 410 and being controlled in its execution by the processor 405. The method 1000 may be implemented as one or more software modules of the dispatcher 680.

The method 1000 begins at the first step 1010, where the dispatcher 680 receives a meta-fill. The meta-fill may be received from the rendering module 660. The rendering module 660 may specify the number of pixels to be rendered, the output format and a current scanline position of the rendering module. The rendering module 660 may also configure an output buffer within memory 406 for placing rendered pixel data.

The method 1000 then proceeds to step 1015 where the tracking point (eg., 1121) of the meta-fill is updated according to a current scanline being rendered. The dispatcher 680 updates the tracking point for the meta-fill by determining the distance between a current y-position of the tracking point of the meta-fill and the y-position of the current scanline. Then the dispatcher 680 multiplies the determined distance (which may be zero) by the tracking point DX (eg., 1122). The result of the multiplication is then added to the current tracking point x-position to determine the new tracking point x-position. The new y-position of the tracking point for the meta-fill is updated to coincide with the current y position of the current scanline. At the next step 1020, a current render position of the rendering module 660 is compared to the tracking point of the meta-fill to determine the number of pixels the current render position is from the tracking point. The determination may be made at step 1020 by subtracting the updated tracking point x-position from the current render x-position.

The method 1000 continues at the next step 1030, where the processor 405 determines an active fill from the fills of the meta-fill. The active fill is the fill of the meta-fill that corresponds to current pixel data to be rendered. At the next step 1040, the number of pixels to render using the active fill is determined. The number of pixels to render using the active fill is determined as the minimum of the number of pixels that the rendering module 660 requests to be rendered and the number of pixels remaining in the active fill. The number of pixels remaining in the active fill is determined on the basis of a maximum x-position of the active fill minus the current renderer x-position.

Once the number of pixels to be rendered is determined, the method 1000 proceeds to step 1050. At step 1050, the required pixel run is rendered. In order to generate pixel data, the dispatcher 680 passes the active fill to a native rendering function according to the fill type of the active fill. Also at step 1050, the current render x-position and the number of pixels to be rendered are updated. The method 1000 continues at the next step 1060, where if there are still more pixels to be rendered, then the method 1000 proceeds to step 1070. Otherwise, the method 1000 concludes. At step 1070, the processor 405 retrieves a next fill in the meta-fill. The fill retrieved at step 1070 becomes the active fill. Following step 1070, the method 1000 proceeds to step 1040.

Figure 8A:
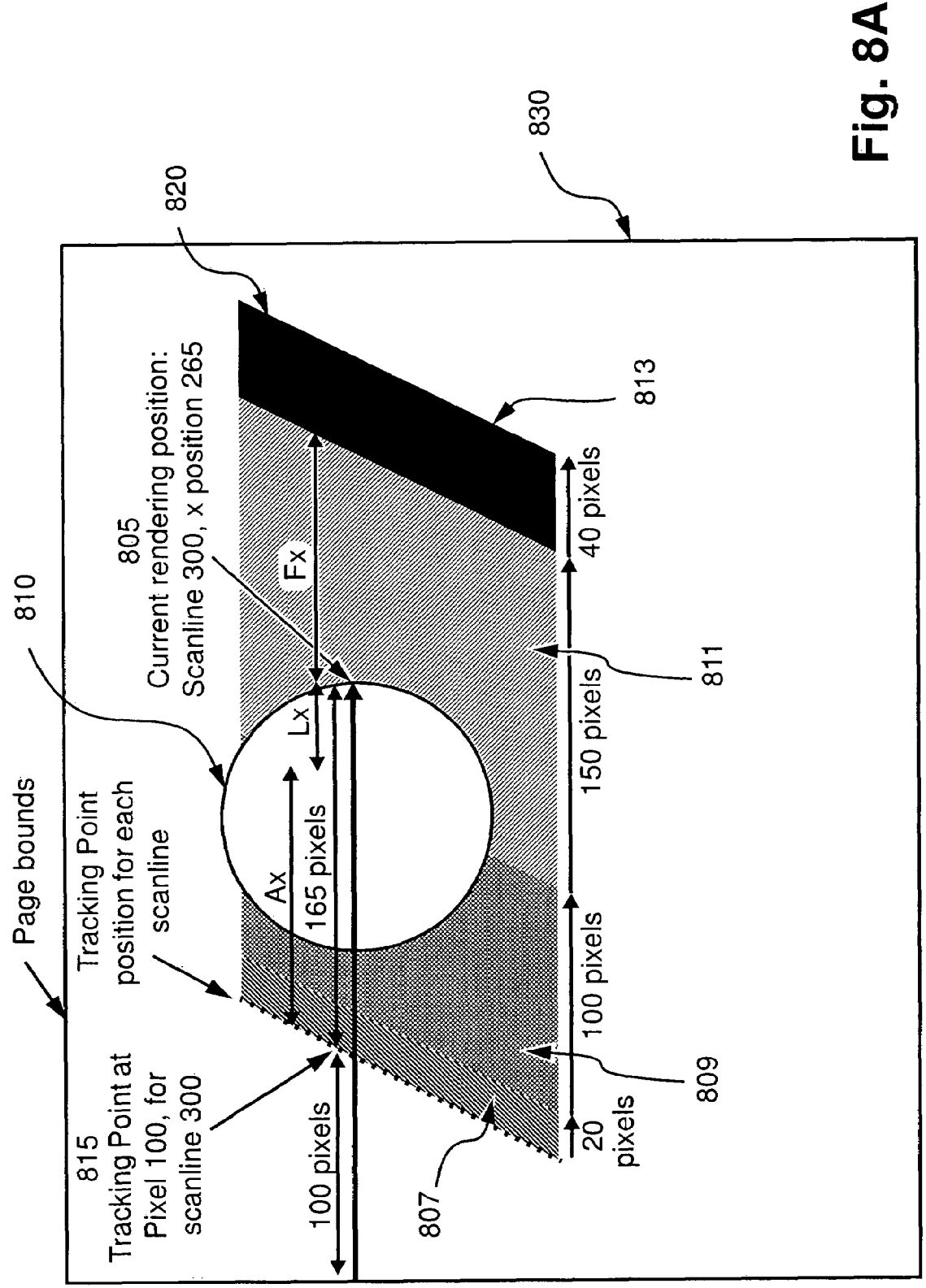
FIG. 8A shows a compiled object with a circle occluding part of the compiled object.
Figure 8B:
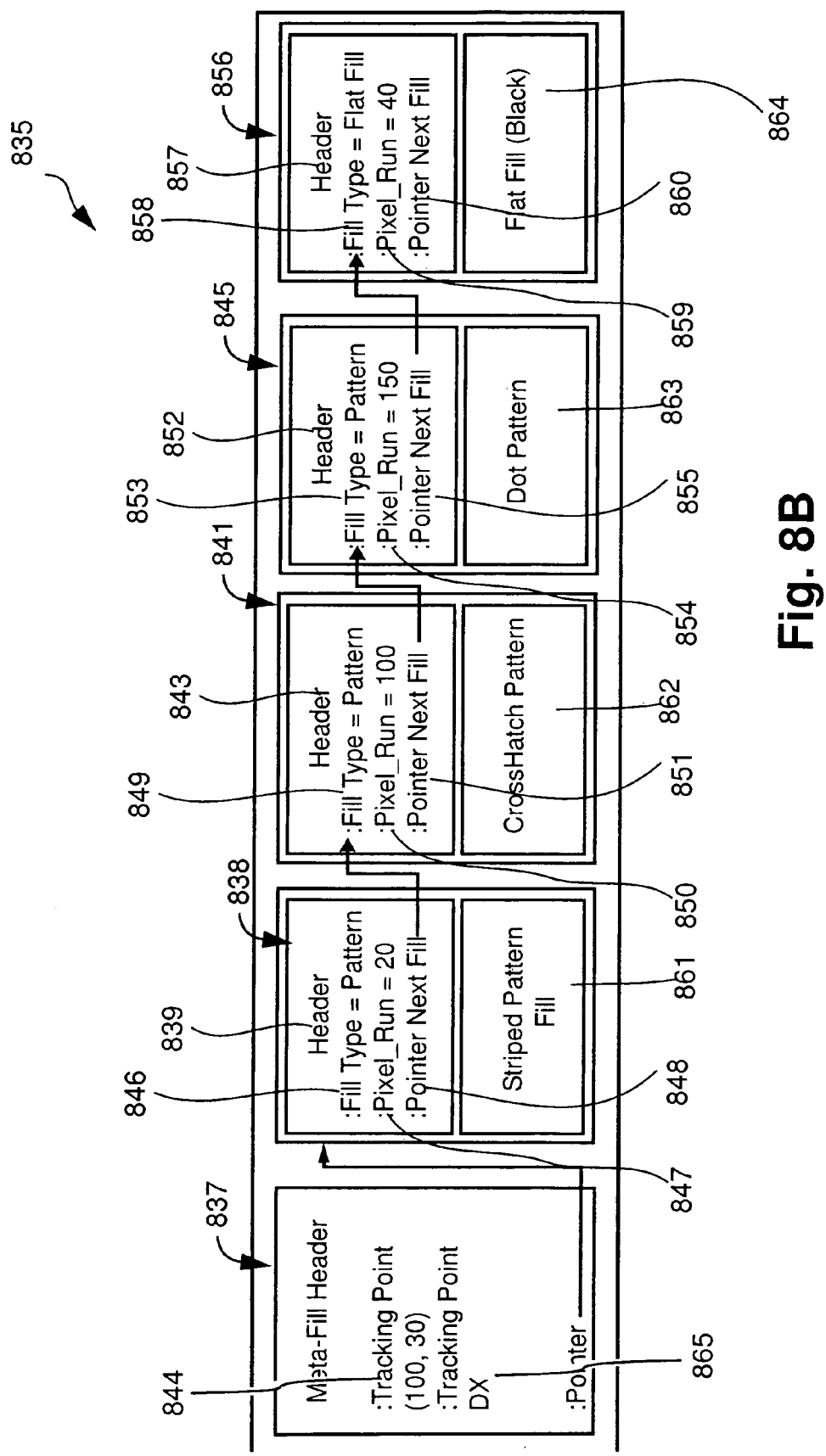
FIG. 8B shows the meta-fill describing fills of the compiled object of FIG. 8A.

As an example, FIG. 8A shows a page 830 comprising a compiled object 820 in the form of a parallelogram. The compiled object 820 has a circle object 810 occluding part of the compiled object 820. The circle object 810 comprises a white flat fill. The compiled object 820 has four fills 807, 809, 811 and 813, which may be included within one meta-fill 835, as shown in FIG. 8B.

The meta-fill 835 comprises a header 837 comprising a tracking point variable 844 indicating the starting location (i.e., pixel 100) of the first fill 807 within the meta-fill 835 for a specified scanline (i.e., 300). The header 837 comprises a tracking point DX 865. The header 837 also comprises a pointer to a fill structure 838 describing the next fill 809.

The fill structure 838 comprises a header 839. The header 839 describes the fill type using a fill type variable 846. The fill type variable 846 indicates that the fill 807 is a pattern fill. The header 839 also comprises a size variable 847 representing the length of a pixel run for the fill 807. The fill 807 covers twenty (20) pixels. The fill structure 838 also comprises the striped pattern fill data 861. Finally, the header 839 comprises a pointer 848 to a next fill structure 841 describing the next fill 809.

The fill structure 841 comprises a header 843. The header 843 describes the fill type using a fill type variable 849. The fill type variable 849 indicates that the fill 809 is a pattern fill. The header 841 also comprises a size variable 850 indicating that the length of a pixel run for the fill 809 is one hundred (100) pixels. The fill structure 841 also comprises the cross hatch pattern fill data 862. Finally, the header 843 comprises a pointer 851 to a next fill structure 845 describing the next fill 811.

The fill structure 845 comprises a header 852. The header 852 describes the fill type using a fill type variable 853. The fill type variable 853 indicates that the fill 811 is a pattern fill. The header 852 also comprises a size variable 854 representing the length of a pixel run for the fill 811. The fill 811 covers one-hundred and fifty (150) pixels, as indicated by the size variable 854. The fill structure 845 also comprises the dot pattern fill data 863. Finally, the header 852 comprises a pointer 855 to a next fill structure 856 describing the next fill 813.

The fill structure 856 comprises a header 857. The header 857 describes the fill type using a fill type variable 858. The fill type variable 858 indicates that the fill 813 is a flat fill. The header 857 also comprises a size variable 859 representing the length of a pixel run for the fill 813. The fill 813 covers forty (40) pixels, as indicated by the size variable 859. The fill structure 856 also comprises the flat fill data 864. Finally, the header 857 comprises a pointer 860 to a next fill structure. However, in the example of FIGS. 8A and 8B, there is no further fill, so the pointer 860 is null-valued.

The circle object 810 has a higher z-order than the meta-fill 835 and is therefore occluding part of the compiled object 820. In response to a current rendering position of the rendering module 660 crossing a point 805 on the circle object 810, the fill associated with a first pixel following point 805 needs to be determined. At the point 805, the y position is three-hundred (ie., the current scanline is three-hundred (300)) and the x position is two-hundred and sixty-five (265). The compiler 670 determines that the fill for the compiled object 820 is the meta-fill 835 and passes the fill to the dispatcher 680 for decompiling, as at step 1010 of the method 1000. The dispatcher 680 updates the tracking point of the meta-fill 835 to coincide with the tracking point 815 of the compiled object 820 for the current scanline (ie., scanline three-hundred (300)), as at step 1015 of the method 1000.

The dispatcher 680 updates the tracking point variable 844 for the current scanline by determining the distance between a current y-position of the tracking point variable 844 of the meta-fill 835 and the y-position of the current scanline (ie., scanline three-hundred (300)) being rendered. Then the dispatcher 680 multiplies the determined distance (which may be zero) by the tracking point DX 865 to determine a new x position for the tracking point variable 844 of the meta-fill 835. The new y-position of the tracking point variable 844 for the meta-fill 835 is updated to coincide with the current y position of the current scanline. In the example of FIGS. 8A and 8B, the tracking point variable 844 for the tracking point 815 of the current scanline is (100, 300), as described above.

The dispatcher 680 may use the determined tracking point variable 844 indicating the tracking point 815 to determine a currently "active" fill, as at step 1030 of the method 1000. The currently active fill is the fill to be rendered for the first pixel following point 805. The dispatcher 680 determines the distance between the x-position at point 805 and the x-position of the tracking point 815. In the example of FIG. 8A, at the point 805, the x-position is one-hundred and sixty-five (165) pixels (ie., 265−100) from the tracking point 815. The dispatcher 680 then goes through a list of linked fill structures 838, 841, 845 and 856 associated with the meta-fill 835 to determine the fill that is associated with the $165^{th}$ pixel from the tracking point 815. The dispatcher 680 determines the fill associated with the $165^{th}$ pixel by accumulating individual pixel run lengths of the linked fills until the current fill covers the $165^{th}$ pixel. For the compiled object 820, the first fill 807 covers twenty (20) pixels, the second fill 809 covers one-hundred (100) pixels, the third fill 811 covers one-hundred and fifty (150) pixels and the final fill 813 covers forty (40) pixels, as described above. In the example of FIGS. 8A and 8B, the third fill 811 will cover the $165^{th}$ pixel from the tracking point 815. The third fill 811 is therefore referred to as the currently active fill. As seen in FIG. 8A, the third fill 811 starts at the $120^{th}$ pixel from the tracking point 815. The line marked Ax in FIG. 8A is one-hundred and twenty (120) pixels in length. With reference to the page bounds 830, the $120^{th}$ pixel corresponds to pixel number two-hundred and twenty (220) on the current scanline (ie., scanline three-hundred (300)). Since the current rendering position of the rendering module 660 is pixel number two-hundred and sixty-five (265), the dispatcher 680 may determine that forty-five (45) pixels (ie., 265−220) of the third fill 811 have been passed, as shown by Lx on FIG. 8A. As seen in FIG. 8A, Fx represents the number of pixels to be rendered for the currently active fill 811. The dispatcher 680 determines that the number of pixels to be rendered for the currently active fill 811 is one-hundred and five (105) pixels (ie., 150−45), as at step 1040 of the method 1000.

The dispatcher 680 then calls on the rendering module 660 to use native rendering functions to render the one-hundred and five (105) pixels of the third fill 811 represented by Fx, as at step 1050 of the method 1000. Once the rendering module 660 has finished rendering the one-hundred and five (105) pixels according to the currently active fill 811, if the dispatcher 680 determines that there are more pixel runs of the current scanline to be rendered then the dispatcher 680 determines a next active fill as at step 1070 of the method 1000.

As described above, graphical objects may be combined to form a compiled object, thereby removing redundant edges. Since the attributes of a meta-fill only have to be determined once, at a high level, unlike edges which need to be constantly sorted and tracked for each scanline, rendering of a compiled object is much more efficient than conventional rendering methods which must sort and track many more edges.

Figure 16:
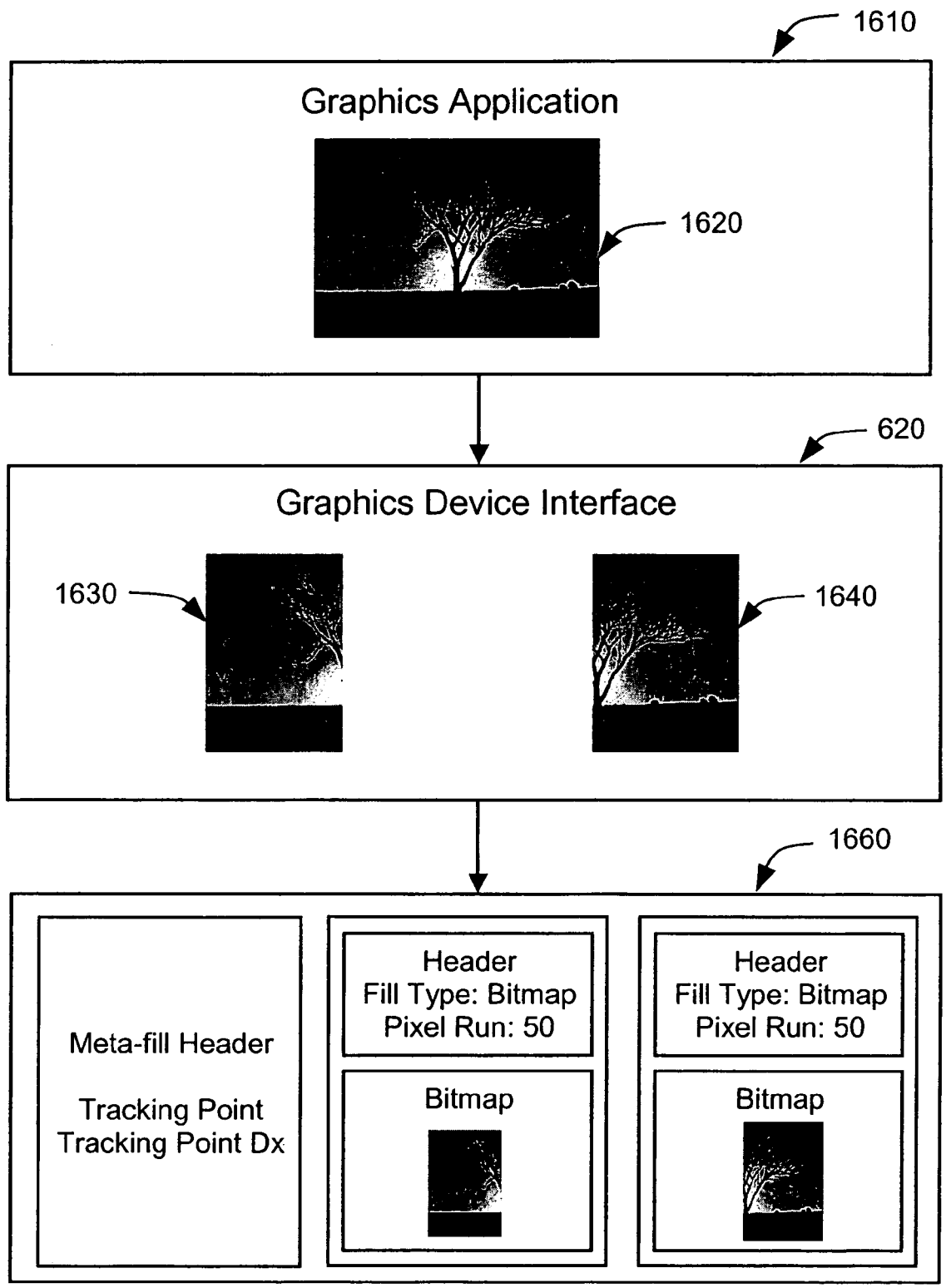
FIG. 16 shows an example meta-fill that links two bitmaps.

The compiler 670 may at step 983 and/or 990 combine graphical objects with different fill types. The compiler 670 combines the edges of such objects and treats fills associated with the objects as separate entities that belong to the same object. Therefore, when combining bitmaps, no extra image manipulation or copying needs to be performed. The fills associated with objects may be processed separately and stored separately but will be linked together by the compiler 670. For example, FIG. 16 shows a meta-fill 1660 that links two bitmaps 1630 and 1640 generated by the graphics device interface 620 of FIG. 6. In the example of FIG. 16, an original bitmap 1620, created by a graphics application such as the graphics application 610, is passed by the graphics device interface 620 as the two separate bitmaps 1630 and 1640. The compiler 670 recognises that the bitmaps 1630 and 1640 lie side by side and so generates the meta-fill 1660 from the two bitmaps 1630 and 1640. In contrast, conventional rendering methods would combine the bitmaps 1630 and 1640 by copying data of one bitmap (eg., bitmap 1630) to the other bitmap 1640, which is inefficient.

As also described above, conventional rendering methods produce many gradient fills from a non-linear gradient fill such as the non-linear gradient fill 510. However, as described above, the gradient fill 510 may be processed as a single compiled object, with multiple fill elements. As such, redundant edges may be removed whilst retaining relevant linear gradients in a meta-fill. For combining simple flat fills, the compiler 670 is no longer limited to just combining objects of the same colour. The compiler 670 may combine objects with different colours and even objects with different fill types, since fills will again be linked. Therefore, whilst edges of objects have been combined into one, all necessary fill information will still be presented to the rendering module 660.

Figure 13:
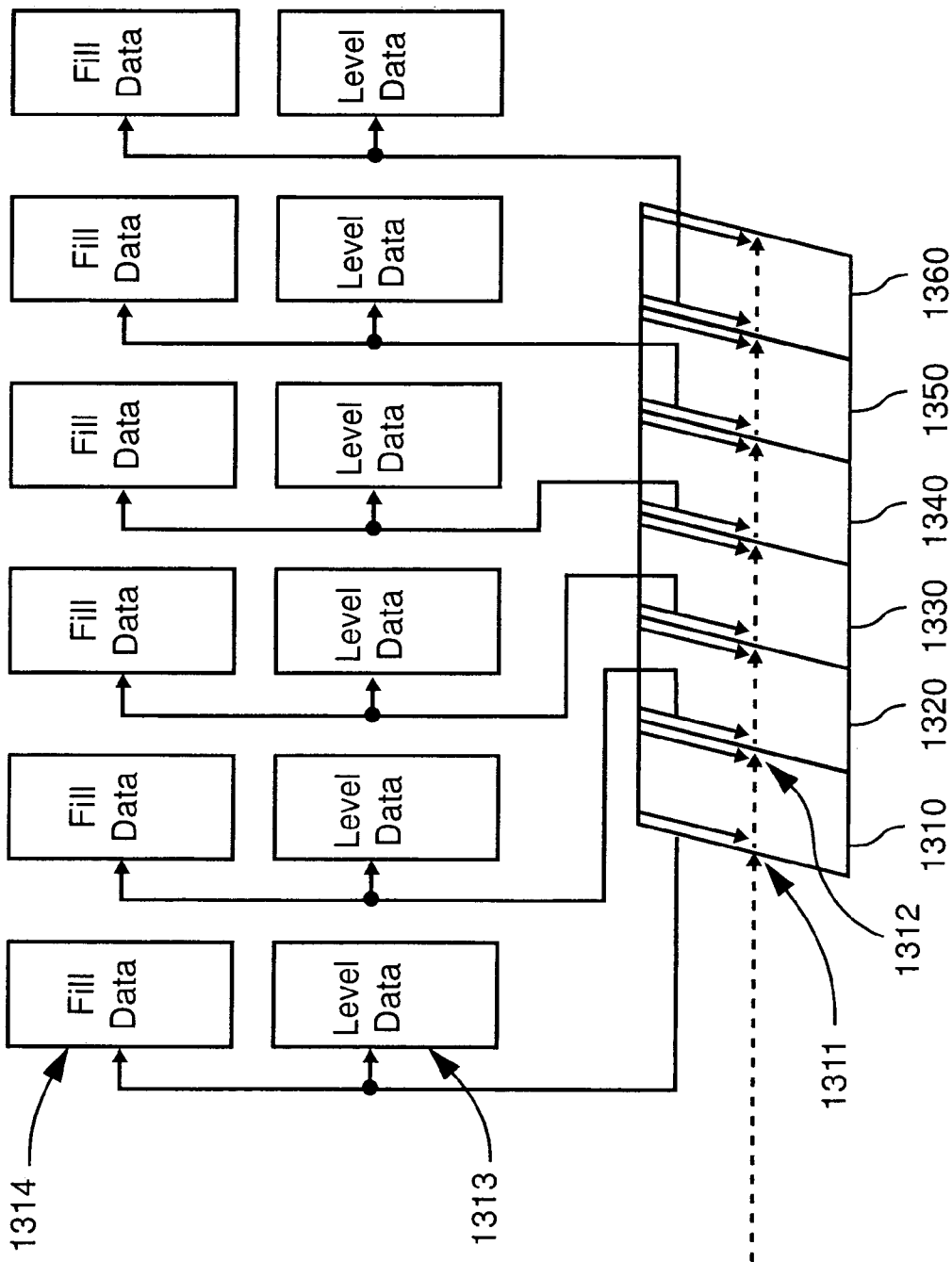
FIG. 13 shows six primitive objects together with associated edge and level data.
Figure 14:
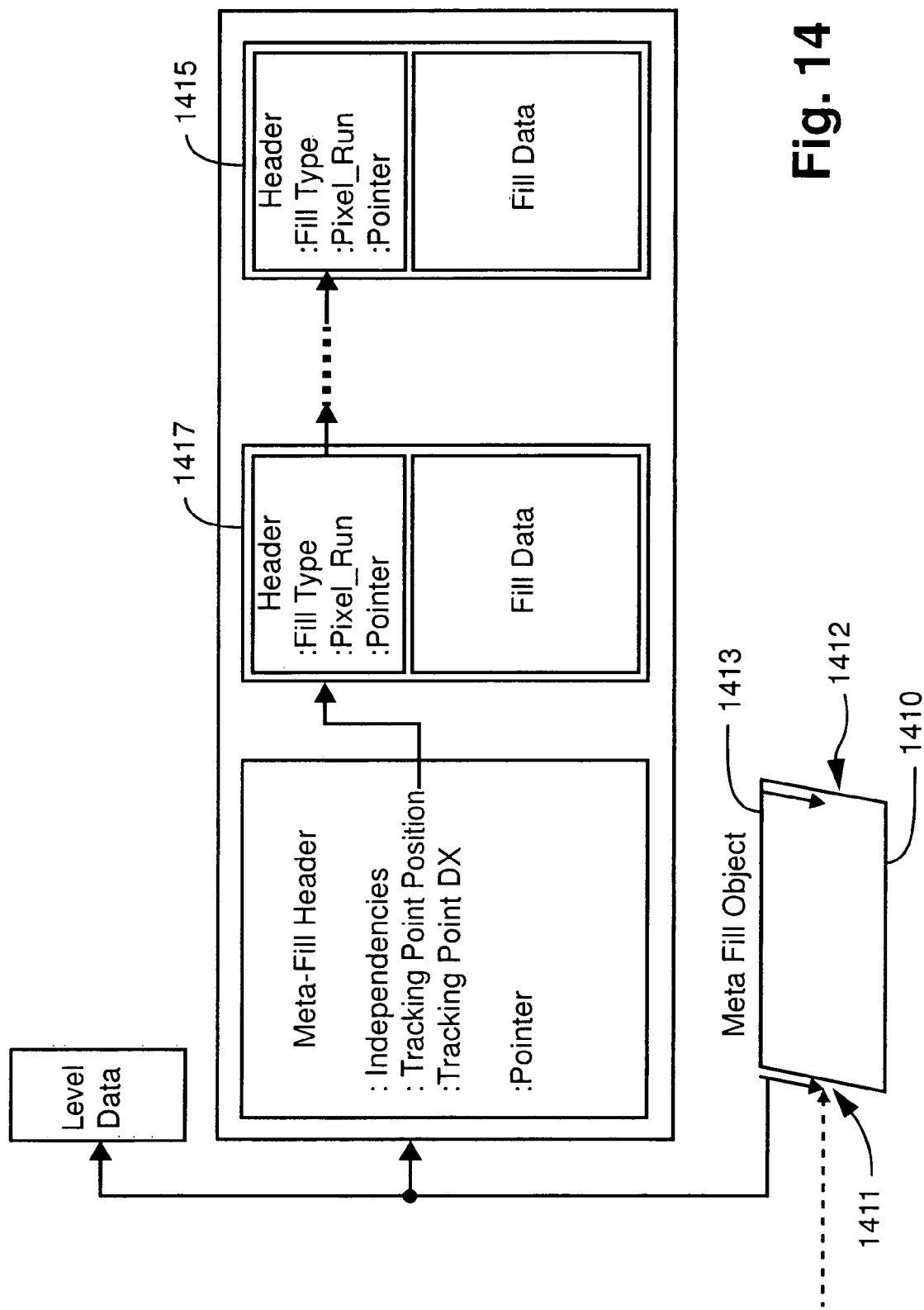
FIG. 14 shows a compiled object formed from the objects of FIG. 13 and the associated meta-fill.

FIG. 13 shows six primitive objects 1310, 1320, 1330, 1340, 1350 and 1360. The conventional rendering system 330 processes each of the objects 1310 to 1360 as two edges (eg., edge 1311 and edge 1312 for the object 1310). Each edge 1311 has associated level data 1313 and fill data 1314. In contrast, FIG. 14 shows a compiled object 1410 formed from the objects 1310 to 1360. The compiled object has an associated meta-fill 1415, as seen in FIG. 14. The rendering module 660 processes the compiled object 1410 as a single object and therefore only has knowledge of the edges 1411 and 1412 that describe an outline 1413 of the compiled object 1410.

To render the primitive objects 1310 to 1360, a conventional edge based rendering module such as the module 360 updates the position of each edge (eg., the edge 1311) of each object for every scanline. For each individual scanline, as the rendering module 360 encounters a left edge such as the edge 1311, the level data 1313 has to be loaded and a pixel run calculated from the fill data 1314. In contrast, by encoding and decoding a meta-fill such as the meta-fill 1415, the rendering module 660 only has to process two edges and only needs to load a single level. For example, the rendering module 660 does not need to individually track the edges of each of the objects 1310 to 1360, since all of the edges (eg., the edges 1311 and 1312) are parallel. As such, fill data may always be determined in relation to a first fill 1417 within the meta-fill 1415, which greatly reduces the amount of effort required by the rendering module. The dispatcher 680 may produce pixel data in an efficient manner. When using a meta-fill such as the meta-fill 1415 the only updating that is required per scanline is that of the tracking point (eg., 1121).

For conventional graphics rendering systems, such as the graphics rendering system 330, which carry out RGB to CMYK colour conversion, there are a number of known methods for representing a CMYK colour converted linear gradient fill. One method is to convert the RGB gradient fill into a bitmap in RGB space and then convert each pixel colour to CMYK to produce a colour corrected bitmap. Another method is to sample many points in the RGB colour space along the gradient fill and colour convert those points to generate many small linear CMYK gradient fills that approximate a colour converted gradient fill. Still another method is to sample the RGB gradient fill and generate a number of CMYK flat fills that represent the original gradient fill.

Representing the linear gradient fill as a CMYK bitmap is highly inefficient compared to the original RGB gradient fill description. Further, breaking the RGB gradient fill up into many small CMYK gradient fills or CMYK flat fills has the disadvantage of producing many edges between adjacent gradient fills and therefore dramatically slowing a conventional rendering module such as the rendering module 360. However, many CMYK gradient fills or flat fills may be represented as a single meta-fill such as the meta-fill 1415 described above. Using such a meta-fill 1415, removes additional edges introduced into an object during colour space conversion.

As more and more objects are combined into a compiled object such as the object 1413, the longer the pixel runs for a compiled object become. Many compiled objects will greatly benefit from longer pixel runs, especially when cached pixel runs can be reused from previous scanlines. For example, combining flat fills of the same colour into one compiled object will generate a larger pixel run of the object and better cache reuse. In addition, since some rendering modules are limited in the amount of objects which the rendering modules can render on a page, generating a compiled object and associated meta-fill as described above may enable the rendering of a page by hardware without the need to form a software fallback job (ie., a job that is rendered purely by software since a current page is too complex for a target device to render).

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

The foregoing describes only some embodiments of the present invention, and modifications and/or changes can be made thereto without departing from the scope and spirit of the invention, the embodiments being illustrative and not restrictive.

The claims defining the invention are as follows:

1. A method of rendering a plurality of graphical objects, each of the graphical objects comprising a predetermined object outline, a predetermined z-order, and an associated fill, the object outline for a particular object defining an area in which the particular object is filled, said method comprising the steps of:
   (a) combining each of the objects to form a grouped object, the grouped object comprising a grouped object outline and an associated compound fill, the compound fill comprising a plurality of fill data structures describing the fills associated with the graphical objects; and
   (b) rendering the grouped object according to the grouped object outline, wherein one or more fills used to render the grouped object are determined according to the compound fill, the rendering comprising the steps, at a current pixel, of;
      (b)(i) calculating a position of the current pixel relative to a tracking point defined for the compound fill;
      (b)(ii) determining a current one of the fills using the calculated relative position; and
      (b)(iii) generating a color for the pixel using the determined current fill.

2. A method according to claim 1, wherein the grouped object outline follows one or more of the predetermined object outlines or parts thereof.

3. A method according to claim 1, wherein the objects are consecutive in z-order and the grouped object is assigned the lowest z-order among the objects.

4. A method according to claim 1, further comprising the step of determining if the objects satisfy predetermined criteria.

5. A method according to claim 1, wherein one or more graphical objects that have the same single colored fills are represented as one or more single colored fills in the compound fill.

6. A method according to claim 1, wherein one or more graphical objects that have a linear color change are represented as one or more linear blend fills in the compound fill.

7. A method according to claim 4, wherein one of the predetermined criteria is that each of the objects has two parallel sides.

8. A method according to claim 7, wherein one of the predetermined criteria is that each of the parallel sides has the same angle of orientation.

9. A method according to claim 8, wherein one of the predetermined criteria is that each of the objects (i) overlap or (ii) abut over the whole length of the parallel sides.

10. A method according to claim 1, further comprising the step of storing lengths of pixel runs in the compound fill.

11. A method according to claim 1, wherein the fills are described in the compound fill by a linked list of the fill data structures.

12. A method according to claim 11, further comprising the step of storing a pointer to a first fill data structure in the compound fill.

13. A method according to claim 1, wherein each of the fills are flat fills.

14. A method according to claim 1, wherein the object outline for each of the graphical objects comprises one or more edges.

15. A method according to claim 1, wherein the object outline is a path.

16. A method according to claim 1, wherein the object outline is a polygon defined by a plurality of points.

17. An apparatus for rendering a plurality of graphical objects, each of the graphical objects comprising a predetermined object outline, a predetermined z-order, and an associated fill, the object outline for a particular object defining an area in which the particular object is filled, said apparatus comprising:
  combining means for combining each of the objects to form a grouped object, the grouped object comprising a grouped object outline and an associated compound fill, the compound fill comprising a plurality of fill data structures describing the fills associated with the graphical objects; and
  rendering means for rendering the grouped object according to the grouped object outline, wherein one or more fills used to render the grouped object are determined according to the compound fill, said rendering means further comprising:
    calculating means for calculating a position of a current pixel relative to a tracking point defined for the compound fill;
    determining means for determining a current one of the fills using the calculated relative position; and
    generating means for generating a color for the pixel using the determined current fill.

18. A computer readable medium having a program recorded thereon, where the program is configured to make a computer execute a method of rendering a plurality of graphical objects, each of graphical objects comprising a predetermined object outline, a predetermined z-order, and an associated fill, the object outline for a particular object defining an area in which the particular object is filled, said method comprising the steps of:
  combining each of the objects to form a grouped object, the grouped object comprising a grouped object outline and an associated compound fill, the compound fill comprising a plurality of fill data structures describing the fills associated with the graphical objects; and
  rendering the grouped object according to the grouped object outline, wherein one or more fills used to render the grouped object are determined according to the compound fill, the rendering comprising the steps, at a current pixel, of:
    calculating a position of the current pixel relative to a tracking point defined for the compound fill;
    determining a current one of the fills using the calculated relative position; and
    generating a color for the pixel using the determined current fill.

19. A method according to claim 1, wherein each fill data structure within the compound fill has an associated width, and said determining step uses the associated widths.

20. A method according to claim 1, wherein a position of the tracking point is updated at the start of each scanline using a step size associated with the compound fill.

21. A method according to claim 19, wherein color for a run of pixels following the current pixel in scanline order is generated using the determined current fill, the length of the run depending on the calculated relative position and the width associated with the determined current fill.

* * * * *

UNITED STATES PATENT AND TRADEMARK OFFICE
CERTIFICATE OF CORRECTION

PATENT NO. : 7,277,095 B2
APPLICATION NO. : 11/071152
DATED : October 2, 2007
INVENTOR(S) : Ian Richard Beaumont It is certified that error appears in the above-identified patent and that said Letters Patent is hereby corrected as shown below:

COLUMN 7:

Line 51, "function" should read --function(s)--.
Line 52, "(s)" should be deleted.

Signed and Sealed this

Tenth Day of February, 2009

JOHN DOLL
*Acting Director of the United States Patent and Trademark Office*